United States Patent
Newman et al.

(10) Patent No.: US 11,240,380 B2
(45) Date of Patent: Feb. 1, 2022

(54) INTERNET PROTOCOL (IP) SERVERLESS PAGE PARTY (SPP) STATION AND SYSTEMS AND METHODS FOR DEPLOYING MULTIPLE SPP STATIONS

(71) Applicant: Hubbell Incorporated, Shelton, CT (US)

(72) Inventors: Adam Newman, Tamworth (GB); David Bensted, Tutbury (GB); Jeff Reid, Sinking Spring, PA (US); Richard Rumsby, Barton under Needwood (GB)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/813,253

(22) Filed: Mar. 9, 2020

(65) Prior Publication Data

US 2020/0213448 A1 Jul. 2, 2020

Related U.S. Application Data

(63) Continuation of application No. 16/100,671, filed on Aug. 10, 2018, now Pat. No. 10,609,222, which is a
(Continued)

(51) Int. Cl.
*H04M 3/56* (2006.01)
*H04L 29/06* (2006.01)
*H04M 7/00* (2006.01)

(52) U.S. Cl.
CPC .......... *H04M 3/56* (2013.01); *H04L 65/1013* (2013.01); *H04M 7/0081* (2013.01)

(58) Field of Classification Search
CPC .... H04M 3/56; H04M 7/0081; H04L 65/1013
(Continued)

(56) References Cited

U.S. PATENT DOCUMENTS

| 6,717,938 B1 | 4/2004 | D'Angelo |
| 7,599,355 B2 | 10/2009 | Sunstrum |

(Continued)

FOREIGN PATENT DOCUMENTS

| EP | 1 881 687 A2 | 1/2008 |
| WO | 2016100795 A1 | 6/2016 |

OTHER PUBLICATIONS

Supplementary European Search Report dated Jul. 2, 2018, which issued in corresponding EP Patent Application No. 15871155.6.
(Continued)

*Primary Examiner* — Quynh H Nguyen
(74) *Attorney, Agent, or Firm* — Dickinson Wright PLLC

(57) ABSTRACT

A serverless Page Party (SPP) station is provided for page announcing and party line conferencing that is configured to implement mutual provisioning to allow all SPP stations within a system to mutually maintain their configurations in runtime, and multiple master station negotiation and master failover. Plural SPP stations are connected with Ethernet cable or WIFi to a network and therefore without need for expensive and cumbersome cabling and daisy-chain configuration among stations. SPP stations route packets between each other via multicast technology and without need for a IP-PBX or other server (e.g., a SIP server) for controlling inter-station connections. In Mutual Provisioning Mode, SPP stations operate using a system configuration obtained from other SPP stations already on the network using a command channel. System configuration is maintained by a SPP station designated as a master station. Plural SPP stations can negotiate among themselves to designate a new master station.

5 Claims, 22 Drawing Sheets

Related U.S. Application Data continuation of application No. 15/536,464, filed as application No. PCT/US2015/066623 on Dec. 18, 2015, now Pat. No. 10,051,129.

(60) Provisional application No. 62/094,438, filed on Dec. 19, 2014.

(58) Field of Classification Search
USPC .......................... 379/201.01, 202.01, 204.01
See application file for complete search history.

(56) References Cited

U.S. PATENT DOCUMENTS

| | | |
|---|---|---|
| 2003/0058806 A1 | 3/2003 | Meyerson et al. |
| 2005/0074031 A1 | 4/2005 | Sunstrum |
| 2005/0232252 A1 | 10/2005 | Hoover |
| 2007/0058545 A1 | 3/2007 | Nookala et al. |
| 2008/0159507 A1 | 7/2008 | Virolainen |
| 2015/0351156 A1* | 12/2015 | Xie .................... H04M 1/2535 455/74 |

OTHER PUBLICATIONS

Chilean Office Action dated Aug. 22, 2018, which issued in corresponding Patent Application 2017-001583.

International Search Report dated Apr. 22, 2016, which issued in PCT Patent Application No. PCT/US2015/66623.

"ADVANCE SmartSeries™ Solutions for Facility Communications & Emergency Notification Systems," GAI-TRONICS, Pub. 961109, Rev. Mar. 2013, 12 pages.

\* cited by examiner

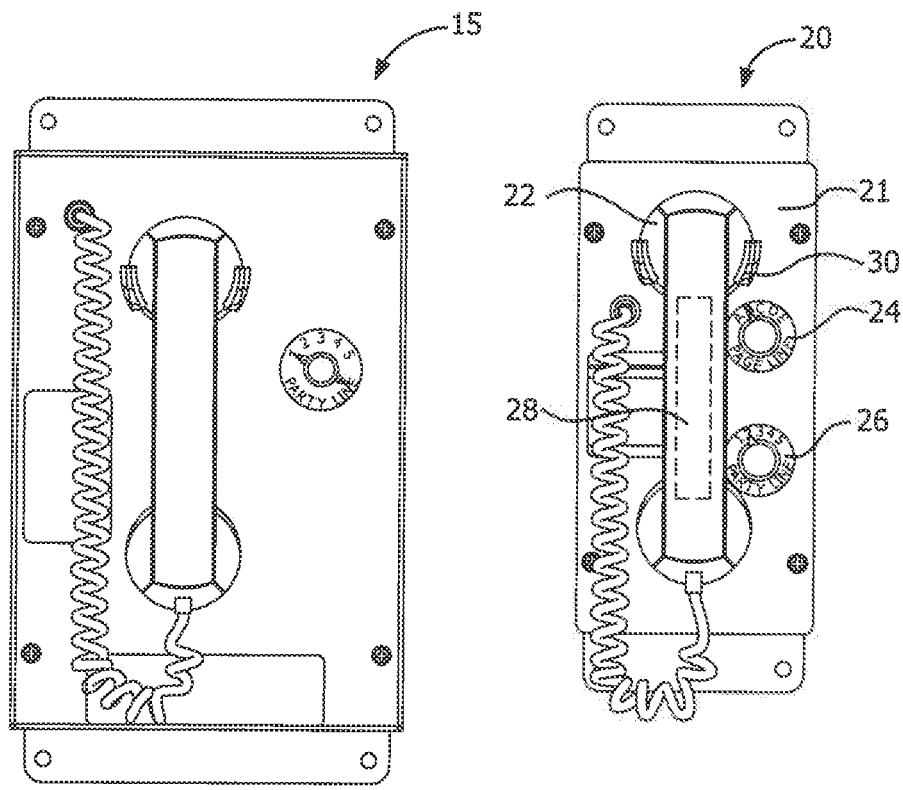
FIG. 2A
Related Art
FIG. 3A
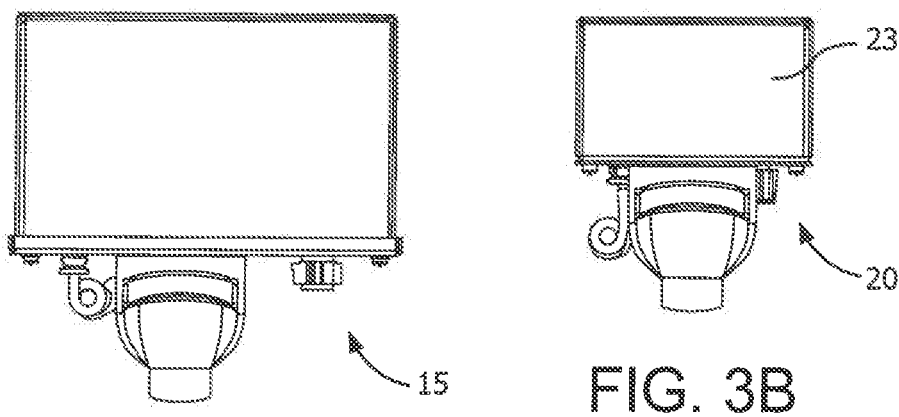
FIG. 2B
Related Art
FIG. 3B

1

INTERNET PROTOCOL (IP) SERVERLESS PAGE PARTY (SPP) STATION AND SYSTEMS AND METHODS FOR DEPLOYING MULTIPLE SPP STATIONS

This application is a continuation of U.S. patent application Ser. No. 16/100,671, filed Aug. 10, 2018, which is a continuation of U.S. patent application Ser. No. 15,536,464, filed Jun. 15, 2017, U.S. Pat. No. 10,051,129, issued Aug. 14, 2018, which is based on PCT Application No. PCT/US2015/066623, filed Dec. 18, 2015, which claims the benefit of U.S. Provisional Application Ser. No. 62/094,438, filed Dec. 19, 2014, the entire contents of which are incorporated herein by reference.

BACKGROUND OF THE INVENTION

Field of the Invention

The present invention relates to an IP-based, serverless Page Party (SPP) station and methods and apparatuses for deploying multiple SPP stations using multicast technology.

Description of Related Art

An existing "Analog" Page-Party station is a product which is widely used in deployments where both Page Announcing and Party Line Conferences are a necessity. Multiple stations work together to allow multiple users to converse on up to 5 channels as well as allowing Page Announcements to be made to local speakers simultaneously.

Such systems are modular, thereby realizing the advantage of being a decentralized system having no single point of failure. Cabling in Page/Party systems such as the system depicted in FIG. 1, however, can be costly and cumbersome.

For example, the more Page or Party Lines required for an installation and the greater the distance between devices, the greater the cost of cabling becomes. Where traditional telephones can contact multiple endpoints (with the aid of an exchange) over a single physical line, Page Party requires a single line per channel. The result is a large bundle of wires connected to each station is used. Also, the station enclosures must be sufficiently large to accommodate extra cabling for future service loops.

Another approach uses a network backbone as the communications infrastructure and Voice over IP (VoIP) devices. With networks, multiple "channels" can be utilized over a single cable. It can be possible to deploy multiple IP devices across an existing network backbone, reducing the cost of added infrastructure significantly still. Such traditional VoIP solutions, however, require the use of a VoIP exchange in much the same manner that an analog telephony system would require an exchange. This approach fails to realize the strength of decentralization by introducing a single point of failure that would otherwise not be present in an analog Page Party system.

A need therefore exists for an improved Page Party station that does not require costly and cumbersome cabling, and an improved system for deploying multiple Page Party stations that does not require interconnection control using a server or other centralized or single point of failure.

SUMMARY OF THE INVENTION

The above and other problems are overcome, and additional advantages are realized, by illustrative embodiments of the present invention.

In accordance with aspects of illustrative embodiments of the present invention, an Internet Protocol (IP)-based station provides page announcing and party line conferencing with respect to other page party stations. The IP-based station is connected to other IP-based stations in a network that supports multicast and point-to-point communication. The IP-based station comprises: a network interface to connect the IP-based station to the network; a selector input configured to select from a plurality of party lines when the IP-based station is configured to transmit and receive audio in party line conferencing with other IP-based stations and transmit and a plurality of page lines when the IP-based station is configured to transmit and receive page announcements with respect to the other IP-based stations, the party lines being assigned respective party line sockets and the page lines being assigned respective page sockets in accordance with a system configuration; and a processing device that operates in a mutual provisioning mode to configure the station to provide page announcing and party line conferencing operations using voice over Internet Protocol (VoIP) on the network. The mutual provisioning mode allocates multicast addresses to designate at least one of respective page sockets and respective party line sockets used by the IP-based station and the other IP-based stations in the network in accordance with the system configuration. The IP-based station, once configured, operates to listen to its configured page sockets for received audio and transmit audio on the respective page sockets when designated by the system configuration, and to participate in party line conferencing on the respective partly line sockets when designated by the system configuration. During the mutual provisioning mode, at least one of the IP-based station and the other IP-based stations is provided with the system configuration upon initialization and operates as a master station and the IP-based station and the other IP-based stations are operable to use a designated multicast address as a dedicated channel. The processing device is configured to perform at least one of sending the system configuration on the dedicated channel when the IP-based station is the master station, and receiving the system configuration via the dedicated channel from one of the other IP-based stations operating as the master station, to obviate a central point for maintenance of configurations of the IP-based station and the other IP-based stations during runtime.

In accordance with aspects of illustrative embodiments of the present invention, the IP-based station operates as a master station and the processing device is configured to control the IP-based station to listen on the dedicated channel for an announcements provided on the dedicated channel by the other IP-based stations, and to send responses to the other IP-based stations via the dedicated channel, at least one of the responses comprising the system configuration.

In accordance with aspects of illustrative embodiments of the present invention, the IP-based station operates as a slave station to one of the other IP-based stations operating as the master station, and the processing device is configured to control the IP-based station to, upon initialization, send an announcement to the master station via the dedicated channel and to receive the system configuration from the master station via the dedicated channel.

In accordance with aspects of illustrative embodiments of the present invention, the system configuration comprises a list of master stations, and the processing device is programmed to negotiate with other IP-based stations on the master list to designate one of them as the new master station.

In accordance with aspects of illustrative embodiments of the present invention, the network interface is at least one of an Ethernet cable interface and a WiFi interface.

In accordance with aspects of illustrative embodiments of the present invention, the IP-based station further comprises a local power source.

In accordance with aspects of illustrative embodiments of the present invention, the IP-based station is configured for at least one of IPv4-enabled communications and IPv6-enabled communications with the other IP-based stations.

In accordance with aspects of illustrative embodiments of the present invention, audio transmitted and received via the IP-based station comprises a real-time transport protocol (RTP) layer of packets structured in accordance with internet standard RFC 3550.

In accordance with aspects of illustrative embodiments of the present invention, the system configuration comprises at least two virtual zones defined using designated station identifiers and zone identifiers.

In accordance with aspects of illustrative embodiments of the present invention, the system configuration comprises a system designation identifying a system, and respective station identifiers for each of the IP-based station and the other IP-based stations deployed in that system. For example, the system configuration further comprises a group identifier for each of one or more groups of IP-based stations deployed in the system and designated ones of the station identifiers that are assigned to each group. Each group has a corresponding group configuration comprising configurable fields that are used to configure each of the IP-based stations assigned to that group, and the system configuration comprises a profile for the IP-based station that comprises the system designation, a group number for the group to which the IP-based station is assigned, and the station identifier of the IP-based station.

In accordance with aspects of illustrative embodiments of the present invention, the system configuration comprises different group configurations for respective group identifiers. Each of the group configurations comprises allocations of multicast addresses that designate respective page sockets and respective party line sockets used by selected ones of the IP-based station and the other IP-based stations assigned to a corresponding one of the group identifiers.

In accordance with aspects of illustrative embodiments of the present invention, the system configuration comprises a fixed IP address for the IP-based station. Alternatively, the master station allocates an IP address to the IP-based station.

Additional and/or other aspects and advantages of the present invention will be set forth in the description that follows, or will be apparent from the description, or may be learned by practice of the invention. The present invention may comprise a IP-based station or IP-based system and methods for configuring and/or operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The present invention will be more readily understood with reference to the illustrative embodiments thereof as shown in the attached drawing figures, in which:

FIG. 2A is a front view of a conventional Page Party station.

FIG. 2B is a top view of a conventional Page Party station.

FIG. 3A is a front view of a serverless Page Party station in accordance with an illustrative embodiment in the present invention.

FIG. 3B is a top view of the serverless Page Party station.

Throughout the drawing figures, like reference numbers will be understood to refer to like elements, features and structures.

DETAILED DESCRIPTION OF ILLUSTRATIVE EMBODIMENTS

Figure 1:
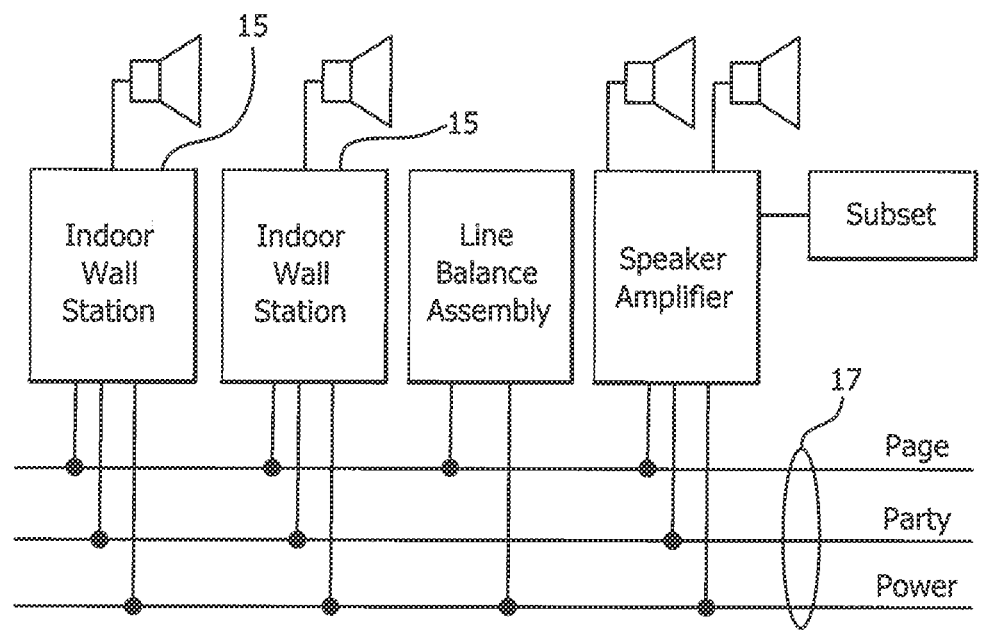
FIG. 1 is a block diagram illustrating a conventional analog Page Party system.

Reference will now be made in detail to embodiments of the present invention, which are illustrated in the accompanying drawings. The embodiments described herein exemplify, but do not limit, the present invention by referring to the drawings.

In accordance with advantageous aspects of illustrative embodiments of the present invention and with reference to FIGS. 3A, 3B, 3C and 3D, an improved Page Party station 20 is provided (e.g., hereinafter referred to as a serverless Page Party (SPP) station) that employs multicast, that is, technology to enable multiple IP devices configured to listen on a given broadcast address to receive data over a network from a single source. The SPP station is configured to have one or more of the following features:

IPv4/IPv6 enabled.

Handset with Pressbar to control Page/Party mode.

Five Configurable Multicast Channels for conference speech with Party Line Selector.

Eight Configurable Multicast Channels for Page announcements with Page Line Selector.

Six Configurable Outputs.

On-board amplifier with non-audible self-check feature and Ambient Level sensing.

Auxiliary analog audio input.

Operation with between 2 and 4095 stations per system.

Mutual Provisioning Mode for easy solution deployment.

As mentioned above, the conventional stations 15 in the system depicted in FIG. 1 are connected to a cumbersome cable 17 (e.g., a 16 core cable) comprising Page, Party lines and power lines in a daisy chain wiring scheme extending from a main cabinet to a zone comprising a group of stations 15 within a designated area. The SPP station obviates the necessity of a bulky cable such as cable 17 and the cumbersome sequential station 15 configuration because it is configured with local power and a much less cumbersome Ethernet cable connection to existing network infrastructure having a standard Ethernet installation and information technology (IT) configuration and other SPP stations. Further, the SPP stations can be configured to be in virtual zones and are not constrained to be in designated physical area zones due to proximity needed for the daisy chain wiring scheme of conventional stations 15.

For existing Page/Party systems employing VoIP, each station 15 or VoIP phone must be commissioned though a central SIP server or IP-PBX which represents an undesirable single point of failure. The SPP station 20 is advantageous over existing stations 15 because it is configured to be serverless in terms of connections with other SPP stations 20, and may use only an optional server for configuration and updates, for example. As described below, each SPP station 20 is also configured to be self-aware, allowing for simple replacement of stations 20 without re-commissioning via a SIP server or IP-PBX.

In addition, the SPP station 20 is essentially real-time operational in that multicast is instantaneously available on the Party line without need for a conference bridge and additional time needed to set up a conference in older systems (i.e., the delay associated with a SIP/server or conference bridge selecting a line for a user, the user dialing into the conference and then pressing a page button, the paging port of an IP-PBX to an amplifier being dialed, the page button being released and then the call going through to the conference bridge).

In accordance with advantageous aspects of the present invention, a customers' IT personnel or other administrator can easily allocate or program multicast addresses/ports or sockets to respective party and page lines employed by SPP stations 20. SPP stations can then listen for RTP on sockets to which they are configured to listen as part of a designated group and convert the RTP to audio for playback. Each SPP station in a group can be listening to a party line, and multiple people can broadcast on the same party line, without the need for an IP-PBX or similar device.

As described herein, the SPP stations 20 and other advantageous aspects of illustrative embodiments of the present invention allow for elimination of a DHCP server. One or more SPP stations 20 can be designated as master stations to manage configuration and updating of any SPP station in its system.

Overview of SPP Station 20 Operations

Page/Party operations are emulated using VoIP.

Party Line Operation:

1. The party-line selector switch has a multicast address/port or socket assigned for each of the five party lines to both transmit and listen to when selected.

2. The station 20 will listen to the page sockets as described in Page Operation below.

3. When a party line is selected and the handset is off-hook, if configured, the amplifier audio will be muted, and the audio from the selected multicast socket will be routed to the earpiece and the audio from the handset microphone will be transmitted on the multicast socket.

Page Operation:

The station 20 can broadcast received page audio while the unit is off-hook in a party-line conversation.

1. A multicast socket is used to transmit and listen to the page line. Page audio is typically not monitored in the earpiece, but the station 20 can be configured such that one station hears the page audio of another in the earpiece when the press bar is depressed.

2. The SPP station 20 performs idle listening to all configured page sockets routing received page audio appropriately to the amplifier. Audio is not routed to the page line until the handset is off-hook and the Pressbar is depressed. When the Pressbar is depressed, the audio from the designated page line socket is routed to the earpiece and the audio from the microphone is routed to the page line socket.

3. Zoning can be accomplished similarly to the current multicast groups on the VoIP telephone described in commonly owned U.S. patent application Ser. No. 14/471,642 using the same priority scheme. The station 20 preferably only receives pages on the configured page receive sockets. One multicast socket can be designated as the local zone socket. This local zone socket can be used for paging from the station. All stations in the same local zone will idle using the local page zone socket. The station also listens to the other X page sockets.

4. Mutual mute is accomplished using the contributing source identifier (CSRC) in the header of the RTP audio packet. The station 20 can allow up to a designated number of CSRC's to be configured in addition to its own. Upon receipt of RTP from any of the configured CSRC's, the station discards the packet. If the audio is received from a CSRC that is not configured, it is routed to the page amplifier assuming it has priority. The audio is preferably only routed to the earpiece if it is from the same local zone socket of the station and the handset is off-hook and the Pressbar depressed.

5. A pre-announce tone is configurable and transmitted to both the earpiece and page line prior to routing voice audio from the handset microphone.

6. If a higher priority page is being broadcast into the local zone, the station 20 does not allow a page to begin, and a busy tone can be heard in the earpiece while the handset is off-hook and the Pressbar depressed. The Busy tone can be configurable with the Defer function described in function item 9 below.

7. The station 20 can support a 600-Ohm audio output for routing received page audio to an external amplifier or other device with a debounced contact closure indicating the presence of audio on the output.

8. The station 20 can have a 600-Ohm audio input for transmitting external audio into the designated page zone. In addition, there can be a contact closure input to indicate when external audio should be broadcast. External audio preferably has the same priority scheme as voice audio where it is prohibited if a higher priority page is being broadcast in the local page zone.

9. In addition to the 5 Party Line sockets, the station 20 can listen on up to, for example, 8 other configurable page sockets for inbound page audio, Each page socket has a priority associated with it from 1 to 8. When Idle or in a Party Line Conference, the station 20 will route the highest priority Page Audio stream being received at the station to the amplifier. The station 20 may be configured to make page announcements on up to four of the 8 existing page sockets. When making a page announcement, the socket used will be the one selected by the Page Zone Selector switch. If this zone is the same as the one being received, then the user will join in with the announcement. In this case, the audio currently routed to the amplifier will be instead routed to the earpiece. Each page socket may be configured to defer. If the selected Page Line is configured to defer, then the station 20 will not allow the user to join the current announcement.

Instead, a busy tone will be played at the earpiece. If the received audio is on a different priority socket than the selected page zone when the Pressbar is depressed, then the user may make a page announcement as normal without affecting the Page audio at the amplifier.

SNMP can be used as a method of monitoring the station. Health checks can include:
a. Device is on-line and functional
b. Handset is in use/off-hook
c. Device in currently paging
d. Handset integrity
e. Handset amplifier integrity
f. Speaker amplifier integrity
g. Speaker integrity Power can be provided either via power over Ethernet (PoE) to provide a maximum output power under POE, or via AUX universal AC or AUX 24 VDC.

Illustrative Usage Scenarios

Figure 4:
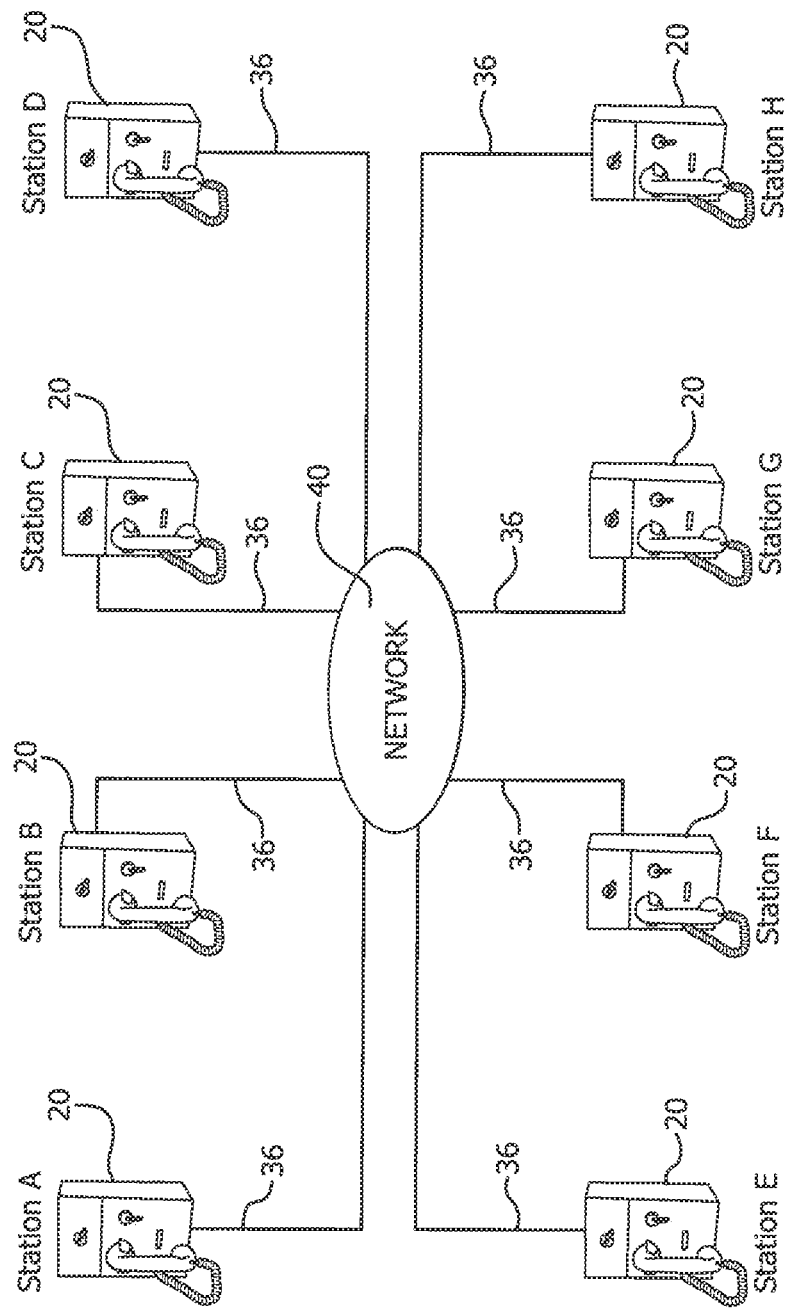
FIGS. 4, 5, 6, 7 and 8 are illustrations of multiple SPP stations in an illustrative installation.

FIG. 4 shows an example installation scenario for multiple SPP stations 20 referenced as stations A through H. All stations 20 are connected to a network 40, each via a single cable 36 (e.g., in this case, an Ethernet cable such as a Cat 5 cable). The network 40 could be a single simple network switch or a complex network. The behavior of the network itself is beyond the scope of this invention and is omitted herein for conciseness. The network is generally existing infrastructure available at the location of deployment and need only be set up such that it allows all SPP stations 20 to route network packets to one another, which includes a necessity for all nodes within the network 40 to handle multicast-based traffic as well as point-to-point traffic.

The ability to (1) connect SPP stations 20 with merely Ethernet cable to a network, and (2) for stations to route packets between each other via multicast technology and therefore without need for a IP-PBX or other server (e.g., a SIP server) for controlling inter-station 20 connections, realizes significant advantages over existing analog Page/Party systems, and existing Smart Page/Party systems employing IP-PBXs or other switch or exchange. As mentioned above, the stations 15 in the system depicted in FIG. 1 are connected to a cumbersome cable 17 (e.g., a 16 core cable), for example, in a daisy chain wiring scheme. Accordingly, the more stations 15 that are used, the more cabling is needed, which can be costly. Further, each station 15 is provided with an extra length of cable 17 for future service loop connections. In many instances, a station 15 enclosure has 2 feet of bulky cable stored therein, which requires a commensurately large enclosure for the station 15. The enclosure 23 for the SPP station 20 can be almost ½ the width of the station 15 as illustrated when comparing in FIGS. 3A and 3B with FIGS. 2A and 2B respectively. The SPP stations 20 are less costly to manufacture and are easier to install in more customer locations than conventional stations 15 because of the overall smaller profiles of stations 20.

In contrast to a Smart Page/Party system that uses an IP-PBX or SIP server for IP paging or conference connections, the SPP stations 20 are configured to be serverless, as described below, thereby obviating a potential and undesirable single point of failure associated with systems that use centralized paging control among stations.

Figure 5:
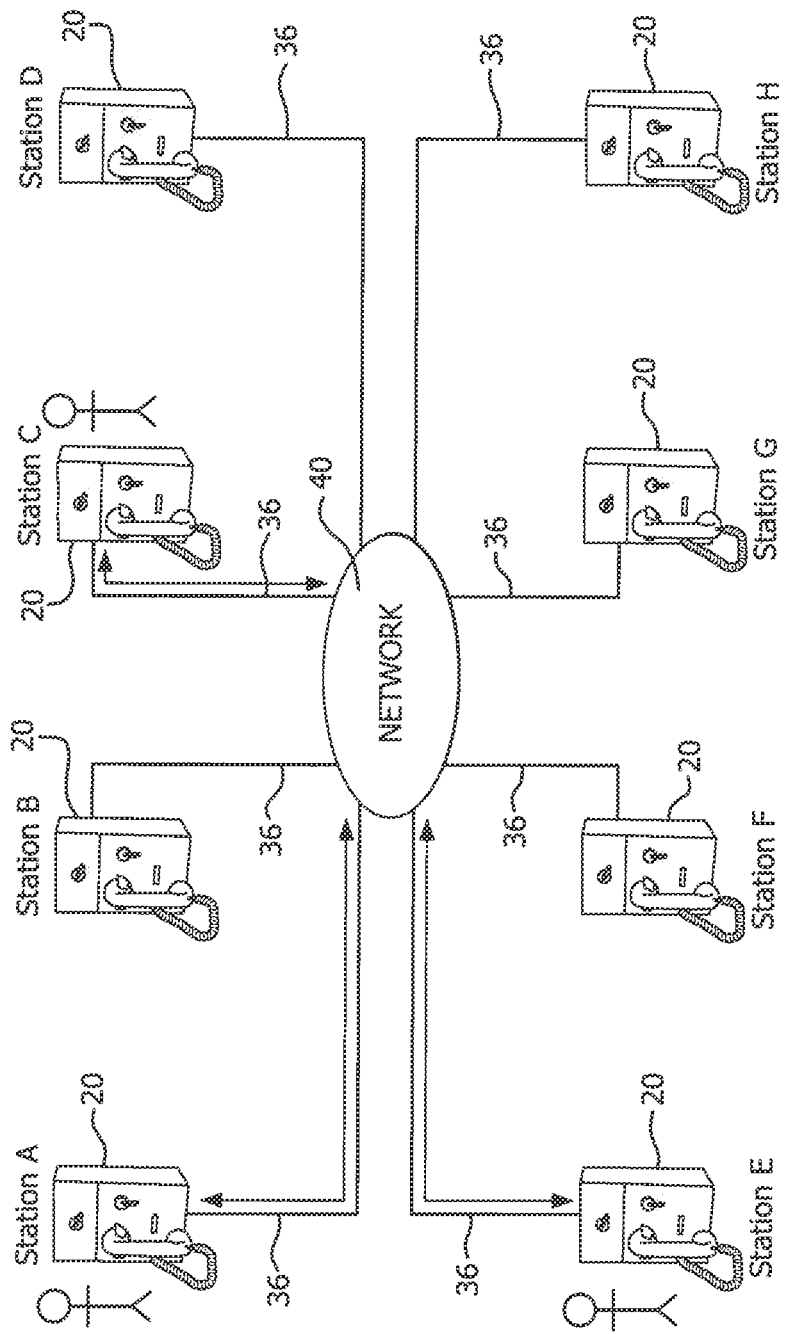

FIG. 5 shows Users at Station A, Station C and Station E in a Party Line Conference on Party Line 1. All 3 users are using their SPP station handsets with the Pressbar released and the Party Line Selector Switch set to 1. All 3 Users may freely converse with one another.

Figure 6:
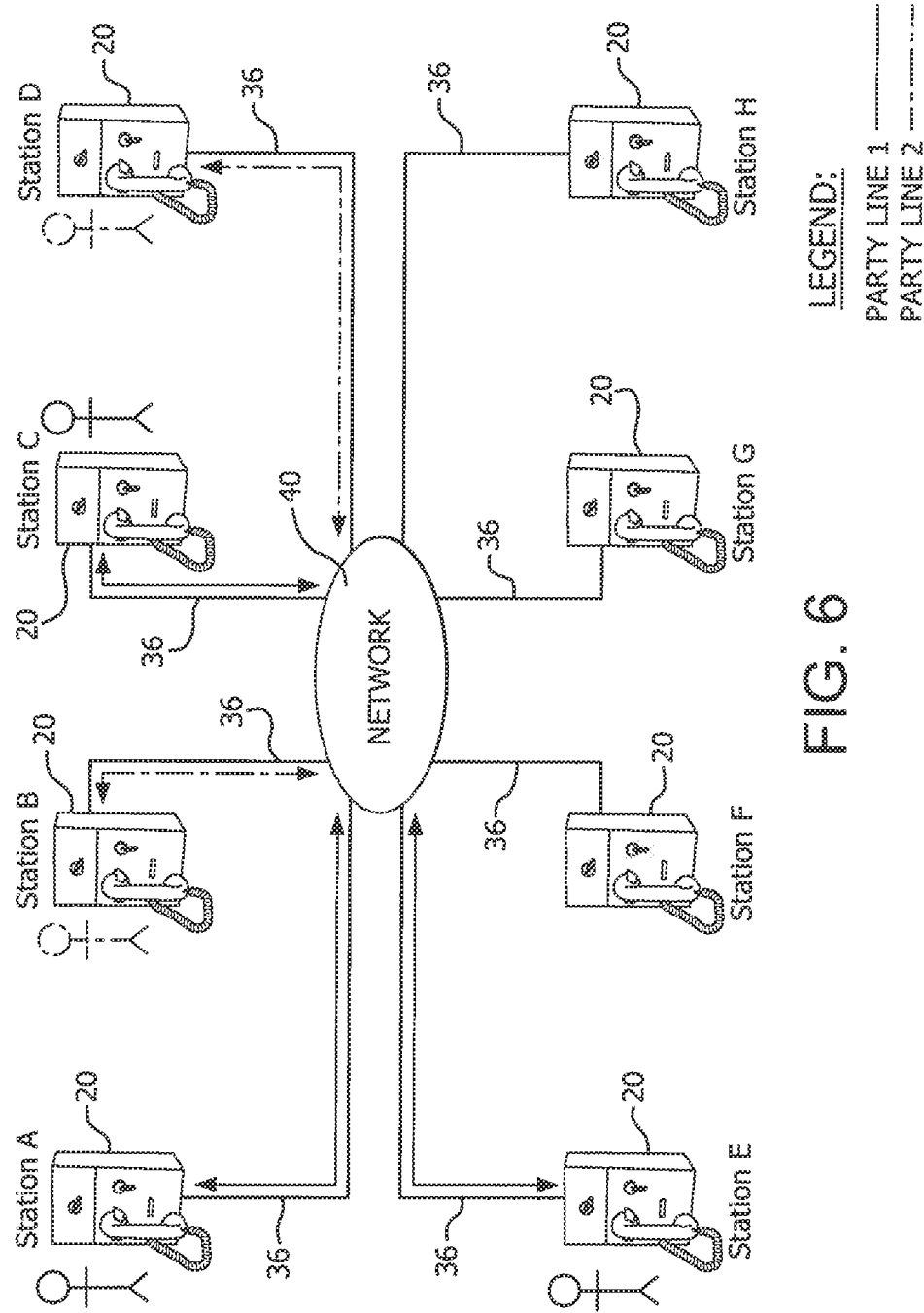

FIG. 6 shows Users at Station B and Station D in a Party Line Conference on Party Line 2. Both users are using their SPP station handsets with the Pressbar released and the Party Line Selector Switch set to 2. These 2 Users may freely converse with one another. The Users from the scenario in FIG. 5 are using the system simultaneously with the Users at Stations B and D. Each group of Users is participating in their own separate conversation over the system.

Figure 7:
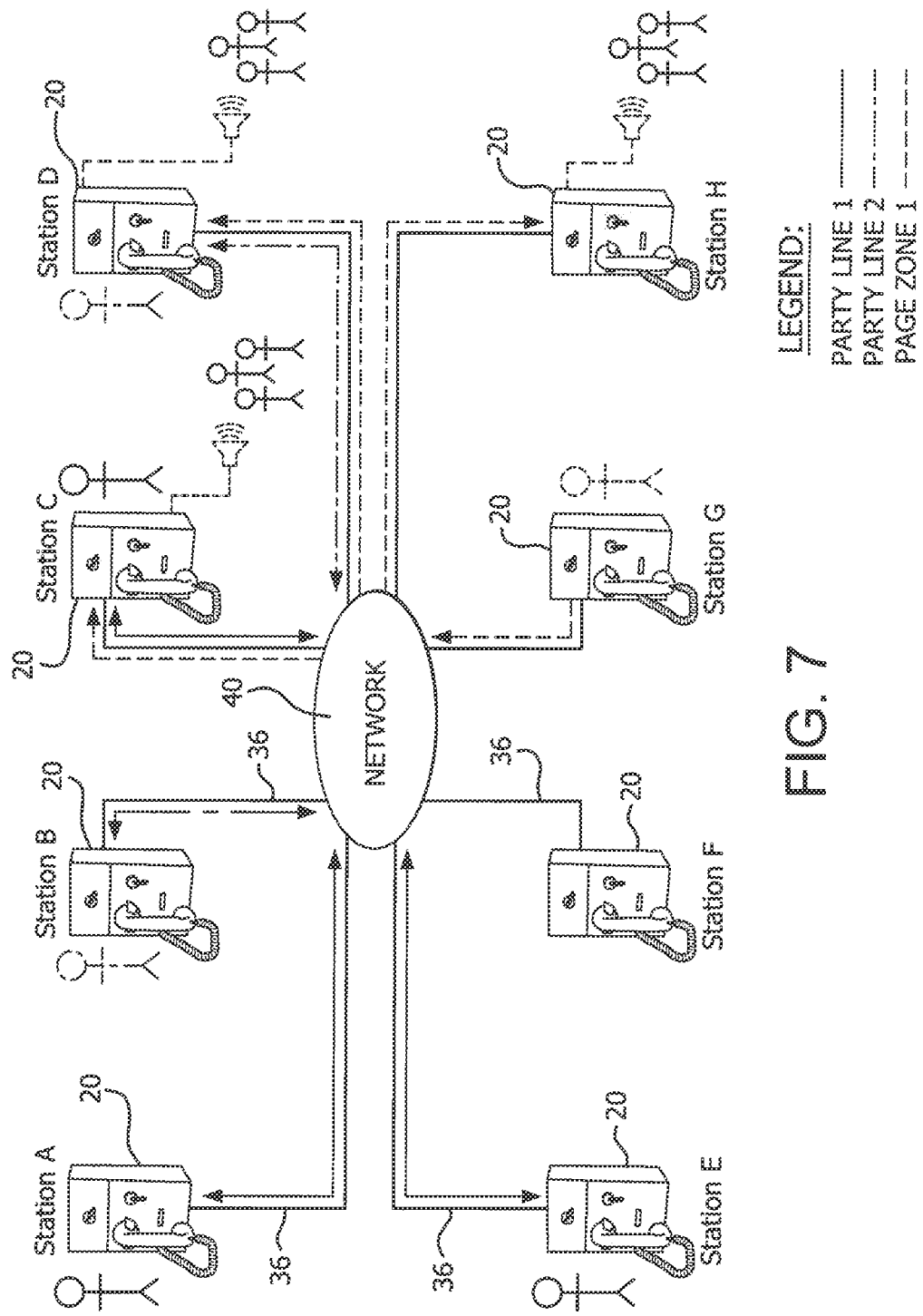

FIG. 7 shows a User at Station G using his/her handset with the Pressbar held down and the Page Destination Zone Selector Switch set to 1 to make a Page Announcement to other stations listening on Page Zone 1. In this case, Station C, Station D and Station H are internally configured to listen on Page Zone 1 and so these stations will play the speech out of the speakers/amplifiers connected to them and not the handset. This audio is single-direction, so no audio is heard at Station G. The Users from the scenarios in FIG. 5 and FIG. 6 are using the system simultaneously with the User at Station G. Page audio can play out of the speaker/amplifier at Station C while the User at Station C may converse in a separate conversation over Party Line 1.

Figure 8:
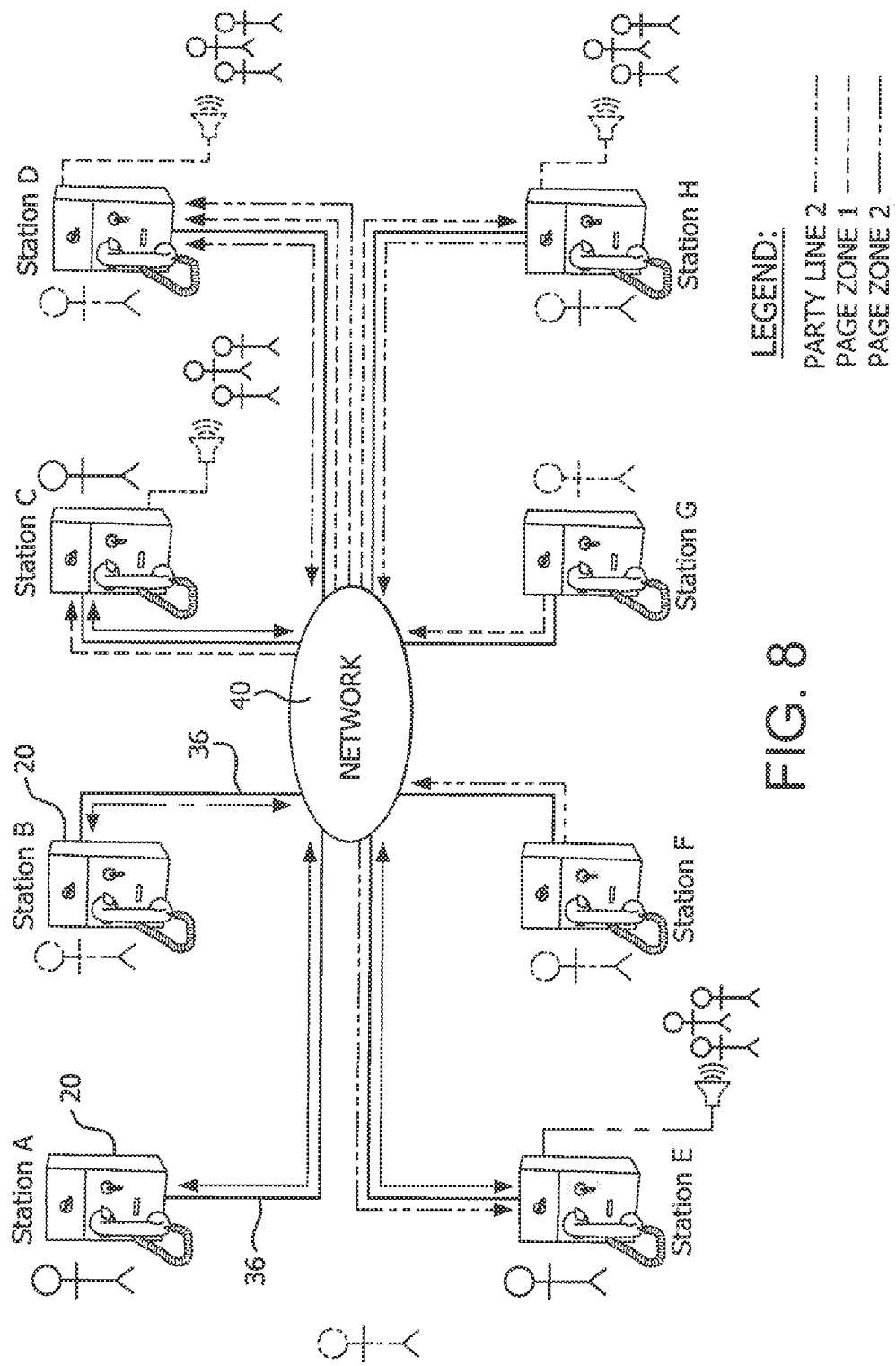

FIG. 8 shows Users at Station F and Station H using their handsets with the Pressbar held down and the Page Destination Zone Selector Switch set to 2 to make a Page Announcement to other stations listening on Page Zone 2. In this case, Station E and Station D are configured to listen on Page Zone 2 and so these stations will play the speech out of the speakers/amplifiers connected to them. Station D is configured to listen on both Page Zone 1 and Page Zone 2. Since Page Zone 2 is set as a higher priority than Page Zone 1, Station D now ignores the audio from Page Zone 1 and instead plays out the audio from Page Zone 2.

Serverless Page/Party (SPP) Station 20 Configuration

Figure 3D:
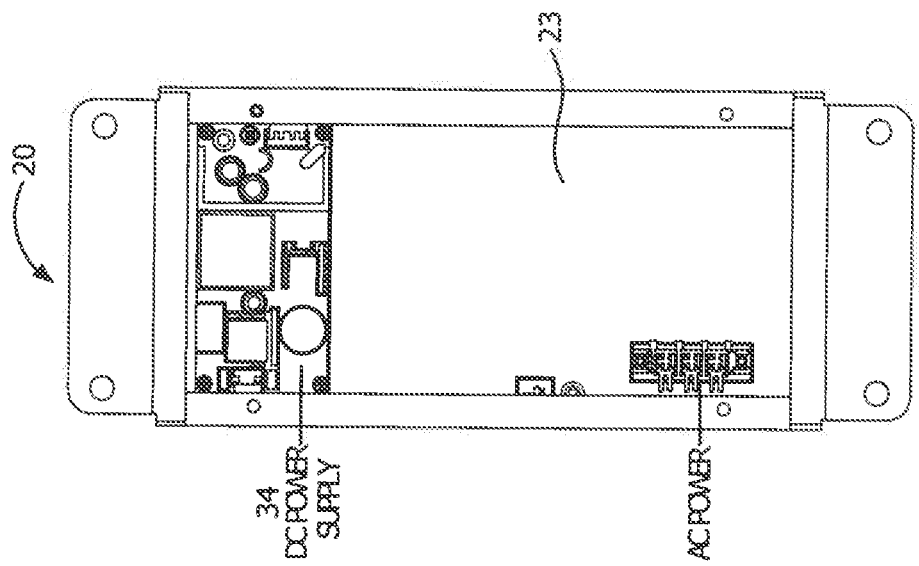
FIG. 3D is an interior view of the serverless Page Party (SPP) station.
Figure 3C:
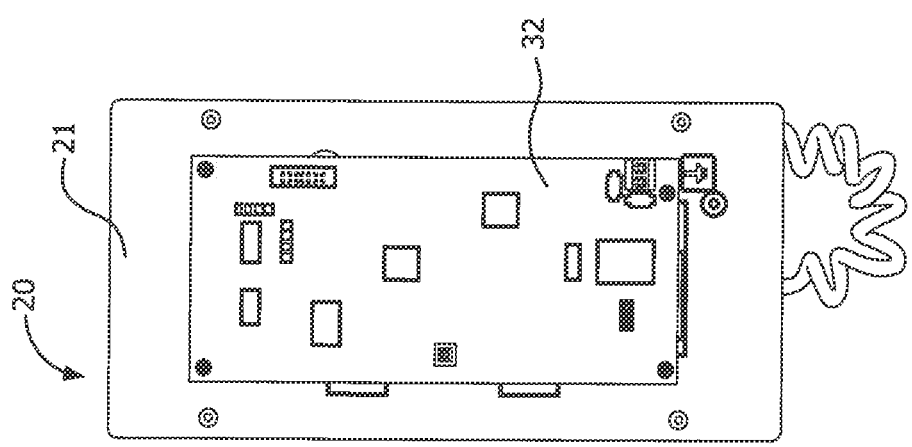
FIG. 3C is a rear view of the front panel of the serverless Page Party station.
Figure 9:
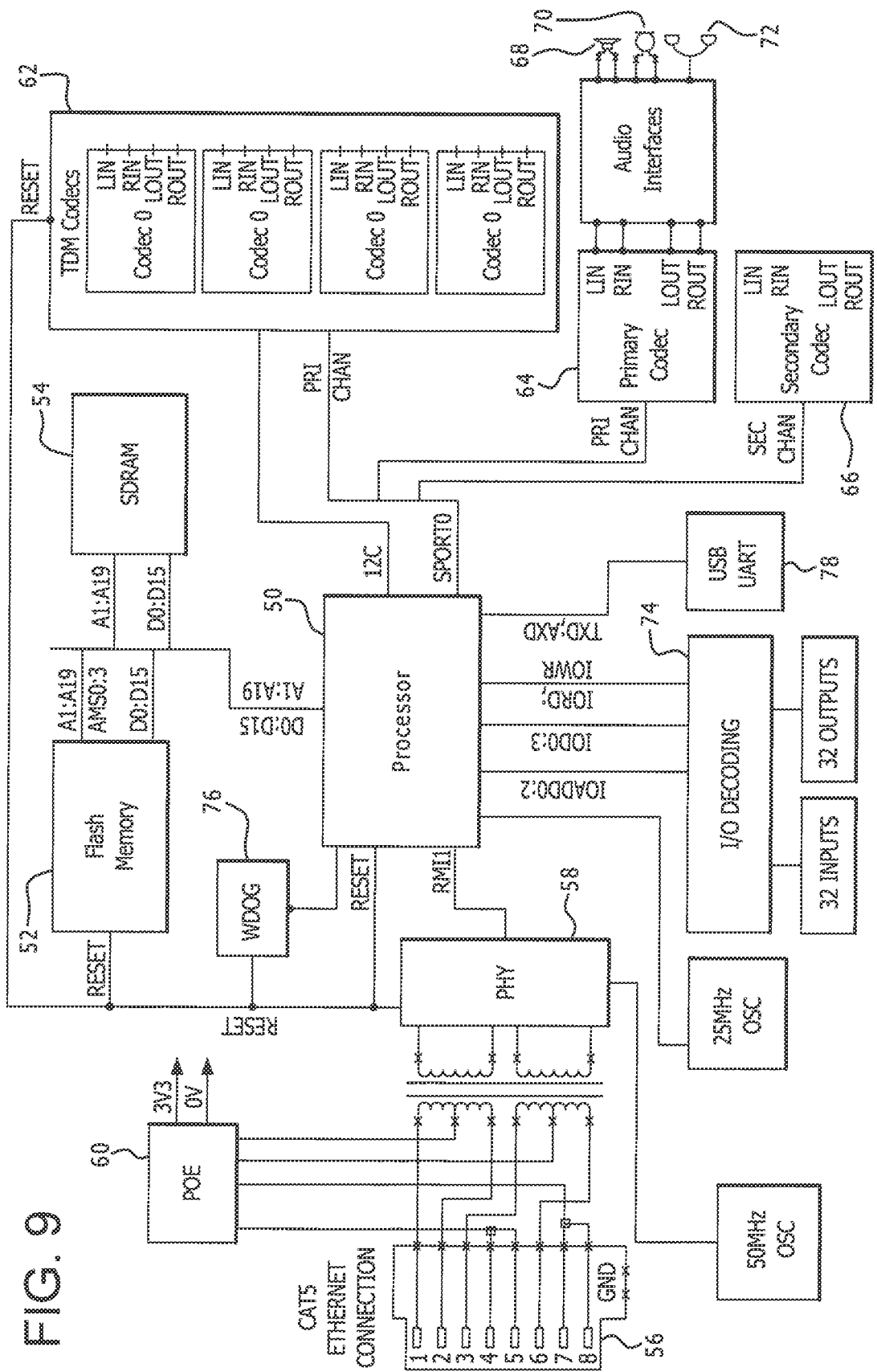
FIG. 9 is a block diagram of a printed control board in the SPP station.
Figure 10:
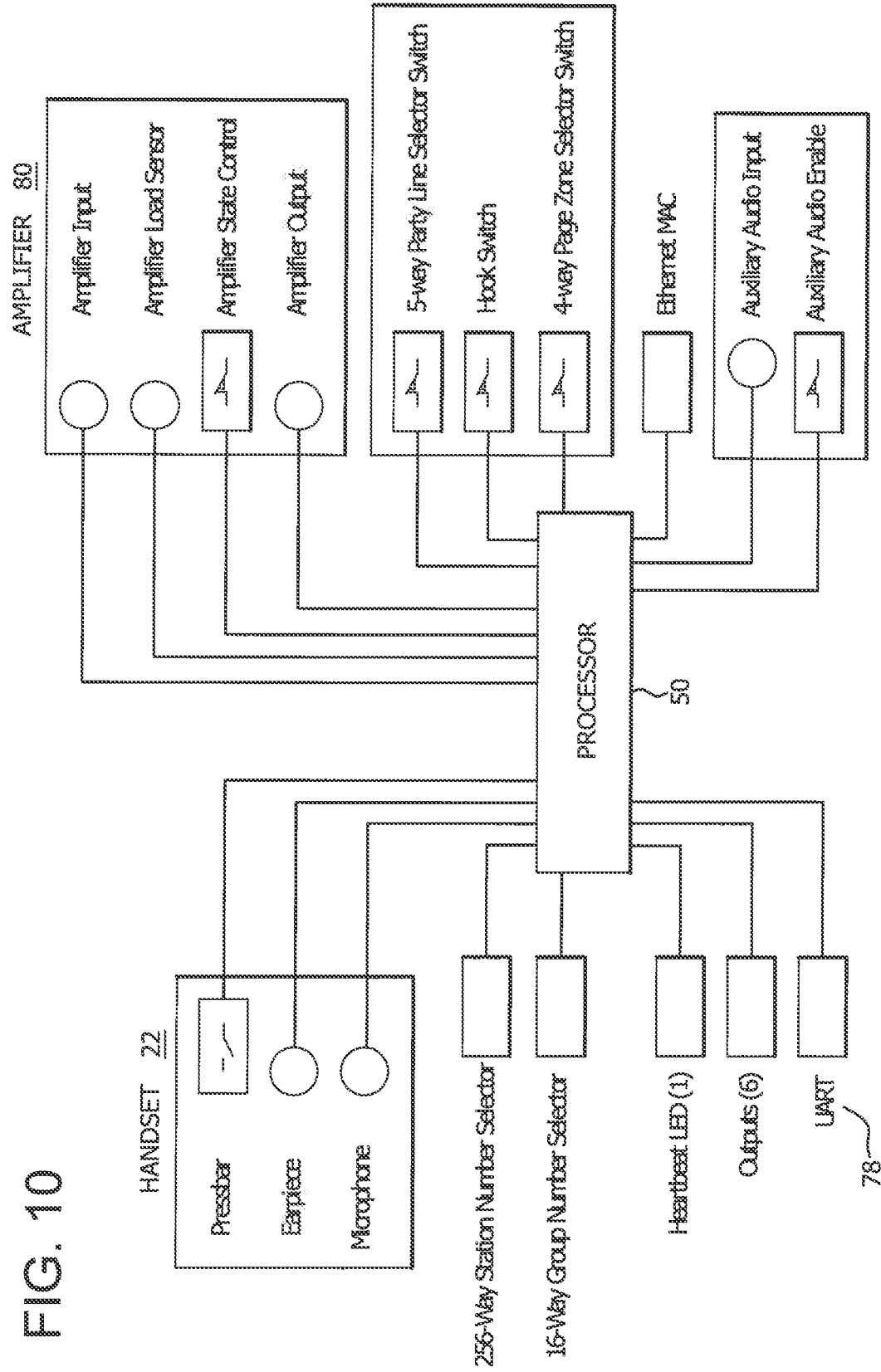
FIG. 10 is a block diagram representing hardware inputs and outputs with respect to a processor on the printed control board in FIG. 9.

With continued reference to FIGS. 3A through 3D and with reference to FIGS. 9 and 10, an SPP station 20 has an enclosure 23 with a front panel 21. A handset 22 and supporting cradle 30 are provided. A user has access to a Page Line selector switch 24 and a Party Line selector switch 26 from the front panel 21. The underside of the handset 22 can be provided with a Pressbar 28 in a conventional manner. It is to be understood that the Page Line selector switch 24, Party Line selector switch 26 and Pressbar 28 can have different form factors and can be provided on the SPP station 20 at different locations than those depicted in FIG. 3A. A main printed circuit board (PCB) 32 is connected to the underside of the front plate 21 as shown in FIG. 3C, but can be mounted within the enclosure 23 in a different orientation or location. The enclosure comprises a DC power supply 34 as shown in FIG. 3D, although other means for providing local DC or AC power can be employed. The station is connected to an Ethernet cable in a conventional manner (not shown). The station can also be configured for WiFi communication in a manner as described in commonly owned U.S. patent application Ser. No. 14/471,642, filed Aug. 28, 2014.

Some of the components on the main PCB 32 are shown in FIG. 9. The main PCB 32 comprises a processor 50, a flash memory 52, an SRAM 54, an Ethernet connection 56 (e.g., a Cat5 or other Ethernet interface) and related physical interface (PHY) circuit 58, and a power over Ethernet (PoE)) interface 60. Non-volatile memory can be used to store, for example, Application data for keeping a static firmware image, and Configuration data for storing modifiable data such as configuration settings, internal events, and so on. A number of TDM codecs indicated generally at 62 are provided for processing signals received and transmitted via the Ethernet connection. A primary codec 64 and optional secondary codec 66 are provided for processing audio signals from the speaker 68 and microphone 70 and other audio interface (e.g., a headset) 72 at the SPP station 20. The main PCB 32 also provides a I/O decoding circuit 74 for connecting different inputs to the processor and conditioning different output signals from the processor. An amplifier circuit 80 (FIG. 10) can be provided on the main PCB 32 or be provided on a separate board within the enclosure. An optional Watchdog (WDOG) circuit 76 and UART 78 connection can also be provided.

With reference to FIG. 10, is a block diagram representing different SPP station 20 hardware elements and their respective inputs and/or outputs with respect to the processor 50. The Party Line Selector Switch 26 is used to choose which of several party lines (e.g., lines 1 through 5, although a different number of Party lines can be used) is currently in use by the SPP station. The Hook Switch detects whether the Handset is on hook or not. The Page Line Selector Switch 24 is used to select the current Page Zone in use by the SPP station. A designated number of Page Lines (e.g., 1 through 4) can be used. The Pressbar (e.g., on the underside of the handset 22) is used to select page audio. The earpiece (e.g., on the handset 22) is used to playback audio received by the SPP station. The microphone (e.g., on the handset 22) is used to sample real sound from the user's voice. The Amplifier 80 shown as the Amplifier Output in FIG. 10 is used to playback Page audio over an Amplifier and speaker 68 on or connected to the SPP station 20. An Amplifier Input (e.g., the Amplifier load) is provided, along with an Amplifier Load Sensor used to read a voltage returned from an Amplifier Health Check. The Amplifier State Control is use to control the Amplifier Mode. Outputs are used to drive external peripherals such as Relays or LEDs. For example, a Heartbeat LED is used for visual indication. The Ethernet MAC (EMAC) is used for network communication with other devices, including the transmission and reception of audio data as well as secondary network services. An Auxiliary Audio Input is used to sample audio from an external analog source. For example, an Auxiliary Audio Contact can be used to signal to the SPP station that it should sample audio from the Auxiliary Audio Input instead of the microphone for a Page Announcement. A UART can be used to output string data from the SPP station 20.

With reference to FIGS. 11-18, operations of SPP station 20 components and software for controlling the same shall now be described.

Figure 11:
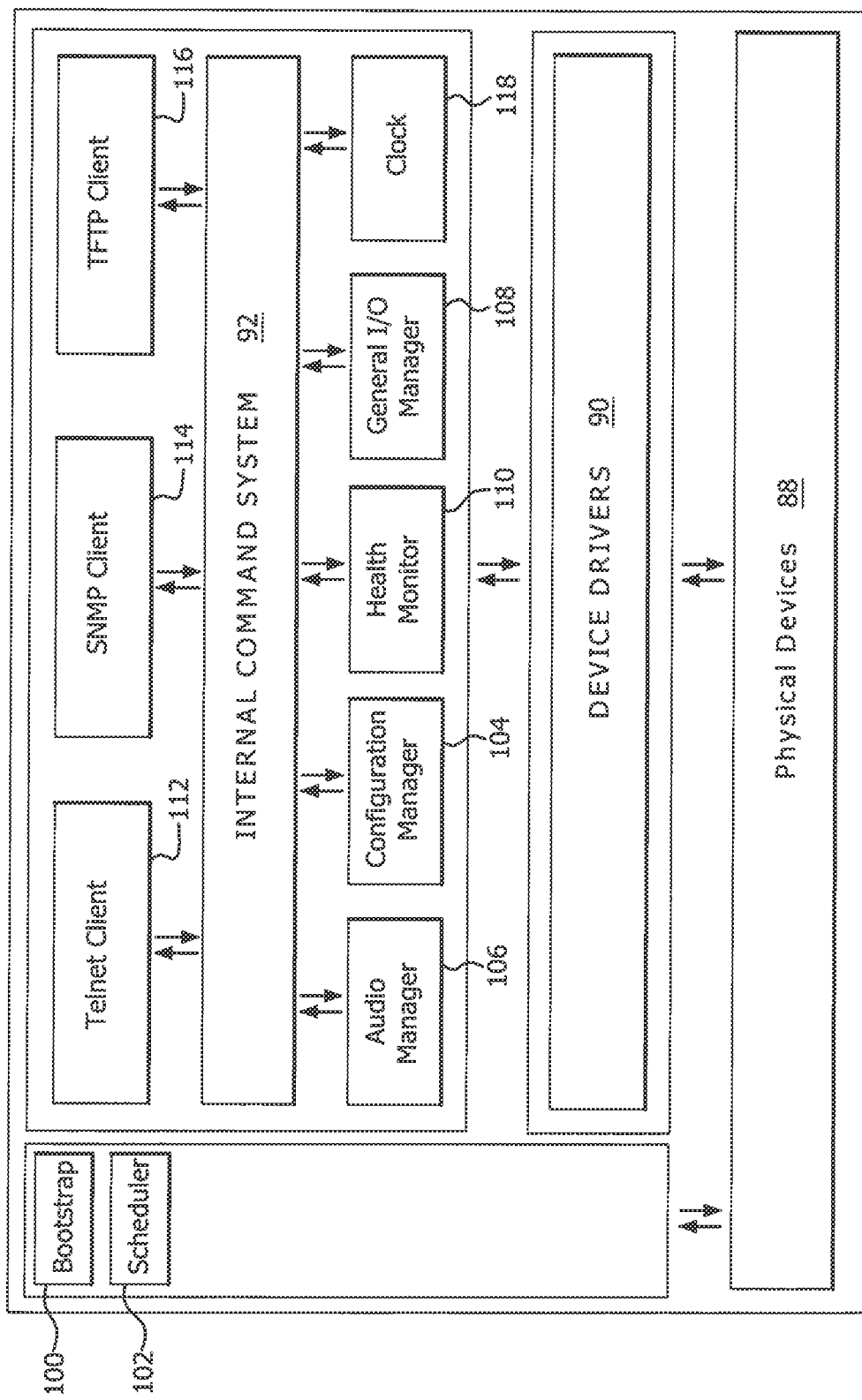
FIG. 11 is a block diagram representing software modules with respect to a processor on the printed control board in FIG. 9.

FIG. 11 is a block diagram representing software elements or modules in the processor 50 of the SPP station 20. Physical devices 88 are described above with reference to FIGS. 9 and 10. The device drivers 90 are a collection of processes which form a control and data interface to the actual hardware devices. They implement hardware control on behalf of application processes and can be hardware-dependent. For example, an Ethernet MAC driver initializes the Ethernet MAC and implements the functions required for data to be written to and read from the device. A codec driver implements local audio data flow inbound and outbound to the station 20, The codec driver initializes any hardware concerning the Microphone, Earpiece, Auxiliary Audio Input and Amplifier, provides the PCM data from the Microphone and Auxiliary Audio Input for the application layer to read, and receives PCM data from the application later to write to the Earpiece and Amplifier. A Timer driver can be provided to implement time signals required for the rest of the system. For example, the Timer driver can handle the timer interrupts generated by a hardware timer.

With continued reference to FIG. 11, a bootstrap process 100 provides an initial process that is run when power is applied to the SPP station 20. This process, for example, comprises the following operations:

Performs a CRC Check on the contents of non-volatile memory.
Initializes the Device Drivers 90
Initializes the Scheduler 102
Initializes the Internal Command System 92
Initializes the Station Clock 118
Initializes the Configuration Manager 104
Initializes the Audio Manager 106
Initializes the General I/O Manager 108
Initializes the Telnet Client 112
Initializes the SNMP Client 114
Initializes the TFTP Client 116
Initializes the Health Monitor 110

When all of these processes have been complete, the bootstrap process 100 hands over control to the Scheduler 102. The Scheduler 102 manages the resource use of the other software processes in the system such as, for example, ensuring that time-critical processes (e.g., audio-related tasks) that need certain resources can get those resources when required (e.g., by deferring any processes that are not time-critical until the resources are available to deal with them). The primary requirement for the Scheduler 102 in this system is to ensure that the time requirements of audio transmission and reception can be met.

Configuration Manager

Figure 17:
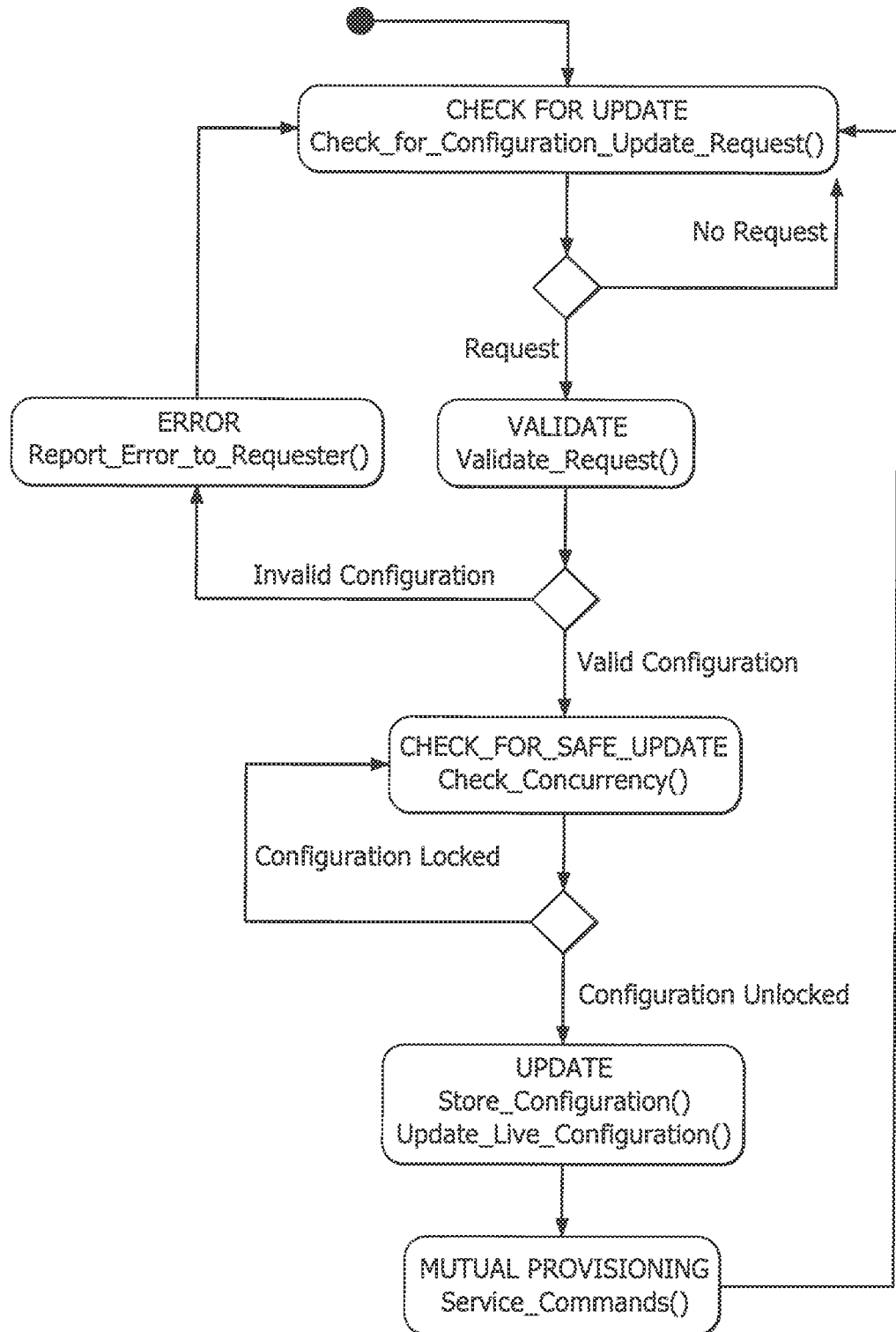

With continued reference to FIG. 11, the SPP station 20 supports a Configuration Manager 104. The Configuration Manager is responsible for maintaining the current running configuration of the station. The Configuration Manager handles all requests for read and write configuration data to both non-volatile memory and the current running configuration. The Configuration Manager 104 is responsible for validating each of the fields it maintains. For example, the configurable fields can be as indicated in the Appendix below. FIG. 17 is an illustrative state diagram for a Configuration Manager as it handles requests for configuration changes, stores/retrieves configuration data, maintains running configuration state, and makes configuration state available to other system services.

Command Channel. The Configuration Manager 104 can use a dedicated Multicast Address/Port for communication with other SPP stations, called the "Command Channel". All SPP stations having visibility and access to this channel may send and receive text data on this channel. Illustrative commands are provided in the below table:

| Mutual Provisioning Mod Protocol Commands | |
| --- | --- |
| Command | Description |
| RD <SD> <CV> <CS> | Request Data command used to send out request for configuration data. Includes current System Designation <SD>, Configuration Version <CV> and Configuration Checksum <CS>. |

-continued

| Mutual Provisioning Mod Protocol Commands | |
|---|---|
| Command | Description |
| PD <SD> <CV> <CS> <GN> <SN> <DATA> | Provision Data command used to send out configuration data <DATA> with Configuration Checksum <CS> and Configuration Version <CV> for device with Group Number <GN> Station Number <SN>. |
| IP <SD> <GN> <SN> <DATA> | IP command used to send out an IP address <DATA> as part of System Designation <SD> for SPP Station with Group Number <GN> Station Number <SN>. |
| AN <SD> <GN> <SN> | Announce command used to announce presence to other SPP Stations, including System Designation <SD>, Group Number <GN> and Station Number <SN>. |
| NM <SD> <GN> <SN> | New Master command used to determine new Master Station in the event that the existing Master goes AWOL. Includes System Designation <SD>, Group Number <GN> and Station Number <SN>. |
| KA <SD> <SV> <GN> <SN> <CS> | Keep Alive command used by the current Master Station to indicate its presence on the network to other SPP Stations. Includes System Designation <SD>, System Version <SV>, Group Number <GN>, Station Number <SN> and Configuration Checksum <CS>. |
| DS <SD> <GN> <SN> | Duplicate Station command used to indicate that the last Announce message contained a Group Number <GN> and Station Number <SN> in System Designation <SD> which are already in use. |

Configuration Storage. Each SPP station 20 individually maintains a copy of the running System Configuration at runtime and also in a nonvolatile store so that it persists between power downs.

System Configuration. The SPP stations 20 use a formal configuration structure called a "System Configuration". This structure contains the configuration of all SPP stations within the system. The System Configuration is preferably always used irrespective of the various Configuration options available. A System Configuration consists of the following logical elements:

System Designation. The System Designation is a string value (e.g. "GTUK Burton") which indicates which system the SPP station belongs to. It is primarily used to prevent conflicts and data corruption when stations are moved between systems. The Administrator should set this value to a unique string to discriminate their System from any others that may be on their network or used within their organization.

There is a reserved designation value "FACTORY". This designation indicates that the SPP station has the default System Configuration applied. This value cannot be set in the SPP manually—it is applied at manufacture time or when restoring from factory defaults.

System Version. The System Version is an integer which defines the version of the System Configuration on a given station. This version number should be incremented by the Administrator when changes are made to the System Configuration so that the new System Configuration is proliferated to all other stations within that System.

Group Number. A Group shall describe the common or general settings that apply to a large number of SPP stations. A System Configuration may define up to 16 Group Numbers. Each Group Number is a unique number within the System Configuration between 0 and 15. This number is unique and has up to 255 Station Numbers associated with it. The Group Number corresponds directly to and is selected by the value set by the Group Selector Switch (FIG. 10).

Each Group has a single Group Configuration associated with it. This is a list of configurable fields within the SPP station which are used for all stations within that Group. For details on which fields are set by Group, see the below Appendix. Each Group also specifies the Network Mode for that Group and any fields required for that mode of operation.

Each Group also specifies a default Profile to use for all stations within that Group.

Station Number. A Station Number is used to identify one specific station within a Group. Each Station Number within a Group must be unique. The Station Number corresponds directly to the value configured by the Station Number Selector Switch.

Station Name. A Station Name is an identifier consisting of two parts; The Group number and the Station Number. For example, the Station Name "2.54" would represent "Station Number 54 in Group 2". Each Station Name has a single Profile associated with it.

Master List. The Master List is a list of comma-delimited Station Names. It describes which stations in this system shall act as the "Master" stations. It also describes the Order of Preference. The Order of Preference is used to determine which of the Masters shall occupy the role of Master Station in the event that the highest in the Order of Preference is missing from the network. E.g. "0.1, 1.3, 0.2" would indicate that the Master Station is 0.1, which fails over to 1.3, which fails over to 0.2.

Profile. A Profile is a list of configuration settings which apply to local and/or station-specific settings. Up to 64 profiles may be defined within a System Configuration. A single Profile may be applied to as many stations as required. Note that some configuration data may be defined in both a Profile and a Group. Where there are one or more fields defined in both Group and Profile, the data for those fields in the Profile is always used and the data for those fields in the Group ignored.

Network Mode. Below are the network modes supported by the SPP station. A single mode is defined within each Group as part of the System Configuration.

Static IP Mode. If Static IP Mode is defined for a Group, that Group shall define the following common data for the SPP stations within that Group:

Subnet Mask
Gateway

In addition, in Static IP Mode, the following station-specific data is defined for each station belonging to that Group:
Fixed IP Address.
DHCP Mode. If DHCP Mode is defined, the SPP stations within that Group operate using an IP Address obtained from a DHCP server as a DHCP client according to RFC 2131. DHCP Mode does the following:
Provisions the SPP station with an IP Address from a DHCP server.
Provisions the SPP station with a Subnet Mask from a DHCP server.
Provisions the SPP station with a Gateway Address from a DHCP server.
Provisions the SPP station with a TFTP Server Address from a DHCP server.
In addition, the following station-specific data can be defined for each station in that Group:
Fixed IP Address.
If a Fixed IP Address is configured, that station does not use DHCP mode.

In DHCP Mode, the SPP station depends upon the presence of a functioning DHCP server to operate. In the event that a DHCP server cannot be found, the station will raise a "DHCP Lost" alarm. During DHCP server loss, the SPP station may be configured to not make Page or Party announcements across the network.

Master Allocation Mode. If Master Allocation Mode is defined, the Group shall define the following common data for the SPP stations within that Group:
IP Address Pool
Subnet Mask
Gateway In addition, the following station-specific data can be defined for each station in that Group:
Fixed IP Address.

In Master Allocation Mode, the IP Address Pool is an IP Address range, e.g. "192.168.1.12 to 192.168.1.46". While operating in this mode, the SPP station will depend upon the Master Station for IP address allocation via the Command Channel. If the SPP station is the Master Station, it only uses a fixed IP address set within the Group configuration. It is the responsibility of the current Master Station to maintain the current address pool for Master Allocation Mode.

If a Fixed IP Address is configured, and would conflict with the IP Address Pool, the address is reserved and cannot be allocated from the Pool. If a change to configuration would create an IP conflict, the Master should resolve the problem by re-allocated addresses as required.

Master Allocation Mode can preferably only be used, for example, with SPP stations running in Mutual Provisioning Mode where there is a currently designated Master Station to perform IP allocation.

Configuration Modes. The SPP station supports two configuration modes. The mode is controlled using the Profile Selector Switch (e.g., the Station and Group number selector switches shown in FIG. 10 which can be, for example, implemented as hexadecimal (0-F) rotary switches on the main board 32). When the Profile Selector Switch is set to 0, the SPP station shall use Manual Configuration Mode, for example. When the Profile Selector Switch is set to 1-255, the SPP station shall use Mutual Provisioning Mode, for example.

Manual Configuration Mode. This mode is intended to allow a SPP station to operate as a standalone device, possibly within a pre-existing and/or 3rd-party Multicast based audio system. It is also intended for use during initial setup for Mutual Provisioning Mode (see below).

In Manual Configuration Mode, the SPP station only uses Group 0 and Profile 0 from its current System Configuration. The SPP station does not share or accept System Configuration data on the Command Channel from other SPP stations in this mode. Manual Configuration Mode does not use Mutual IP Allocation and does not use or need "Master" stations.

Mutual Provisioning Mode. This mode is intended to allow all SPP stations within a system solution to mutually maintain their configurations in runtime, without the support of a fixed central point such as a server, and without the need for human administration.

Mutual Provisioning Mode is intended to streamline the initial set-up process by separating the system design/planning and system installation stages of a customer solution, and also intended to minimise the cost and effort required to maintain/replace faulty SPP stations in an existing system.

In Mutual Provisioning Mode, SPP stations operate using the System Configuration obtained from other SPP stations already on the network using the Command Channel.

Feature Summary for Mutual Provisioning Mode:
All stations share a System Configuration.
Two Selector Switches to control Group and Station Number.
Fixed Multicast address/port "Command Channel" used for configuration control and proliferation between stations. Factory Configurable.
16 Groups, each with configurable fields.
64 Profiles, each with configurable fields.
Static, DHCP or Mutually Allocated IP settings.
Mutual Provisioning only used for configuration, does not affect is not required for actual station operation.
System wide control via single "Master" station. Master Station (and backups) determined by System Configuration.
System wide interface via the Master Station. IP Address determined according to configured Network Mode, can be configured as Static within DHCP or Master Allocation Mode if required.
Individual SPP stations may be isolated from Mutual Provisioning Mode by setting the Station Number and Group Number switches to "0".

An illustrative basic flow of events for setting up a system when using Mutual Provisioning Mode is as follows:

Generate System Configuration. SPP stations running Mutual Provisioning Mode obtain their configuration information from the System Configuration. The System Configuration captures the configuration of all SPP stations within the system. This is the point of solution design and should take place prior to the actual installation of the SPP stations. Typically an Administrator would generate the System Configuration as a file using a text editor, to be subsequently applied to the first SPP station.

Connect & Configure the First SPP station. The Administrator takes the first SPP station and sets the Group Selector Switch to 0 and the Station Number Selector Switch to 0. This puts the station into Manual Configuration Mode. This station is then connected to a laptop/PC using a network cable and powered.

An Administrator should interface to this station and either update the existing System Configuration or load a previously generated System Configuration File. As part of this, the Administrator should set a new System Designation, e.g. "GTUK Burton" and System Version, e.g. "1". Whenever the System Configuration is altered in any way, the SPP station shall validate the entire configuration to ensure that the settings are compatible. If the file is valid, the SPP station shall generate a new MD5 Checksum against that file which can be used as an identifier.

Once the new System Configuration has been applied to the SPP station, the Group/Number Selector switches should be set to their appropriate values. This shall trigger a reconfiguration on the station which will apply the settings according to the System Configuration for that Station Name, e.g. "0.1".

Once the reconfiguration process has completed, the SPP station (henceforth known as Station 0.1, since it now has a Station Name) announces itself on the Command Channel using the AN command, which contains the System Designation, Group Number and Station Number.

Duplicate Station Detection. The AN Command is used to announce the presence of an SPP station which has either just powered up or has just had its Group and/or Station Number setting changed. When other stations on the system received the AN command, they respond with a DS command if they share the same Group Number, Station Number and System Designation. The DS command indicates to the initial SPP station that there is a duplicate station on the system. In this event, the first SPP station shall raise a "No Configuration" alarm.

The station then listens on the Command Channel for the KA command from the Master Station. If the KA command is not received within 3 times the set Keep Alive period, and if this station is included in the Master List, this station issues a NM command to the command channel (see later) to advertise its Group and Station Number on the System to other Master Stations present. As this is the first station, there will be no response and so it shall designate itself as the "Master" station for the overall System. If that station is using Master Allocation Mode, the station shall also allocate to itself an IP Address from an address range set by the Administrator as part of its Group.

Master Station. The Master Station is an SPP station which has been designated the role of maintaining the System configuration on behalf of all SPP stations within the system. The Master Station also serves as the interface point for the Administrator.

Figure 19:
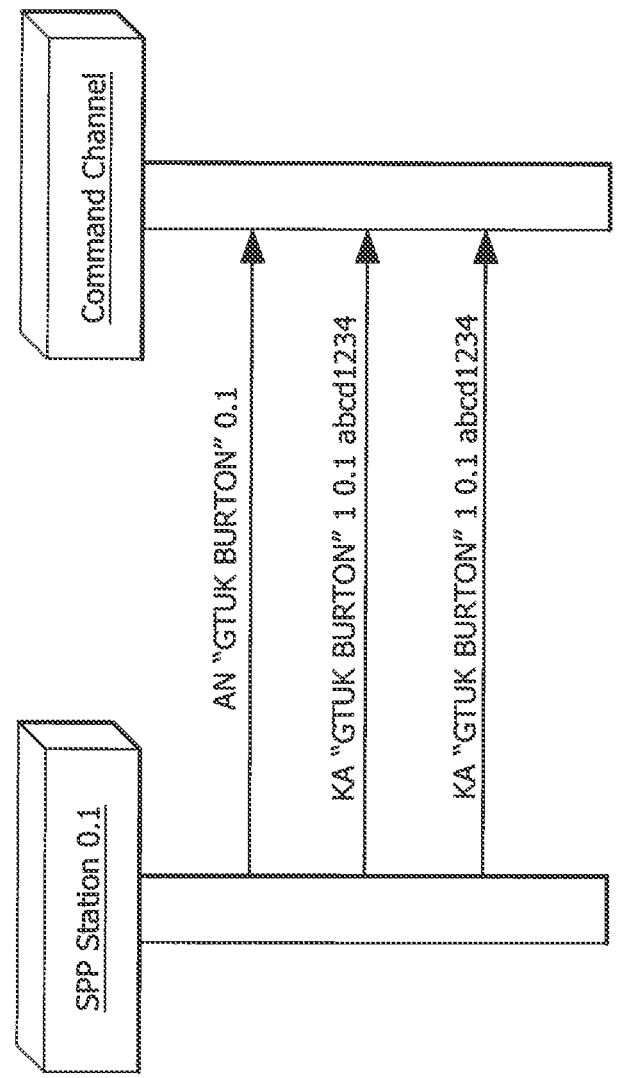
FIGS. 19, 20 and 21 illustrate command channel flow between SPP station in accordance with illustrative embodiments of the present invention.

Keep Alive. During runtime the Master Station uses a "Keep Alive" mechanism to inform other SPP stations that it is still present and functional within the system. The "KA" command is used for this purpose (see Command Channel Table above). This command is repeatedly issued over the command channel at an interval equal to the Keep Alive period (factory configured value) by the Master Station. With reference to FIG. 19, The KA command contains the Group Number, Station Number, System Designation, System Version and Configuration Checksum of the Master Station that issued it. SPP stations will ignore the KA command if it contains a System Designation that does not match their own (except for SPP stations with the "FACTORY" designation).

Introduce New SPP Stations. The installer takes a second SPP station (disconnected and unpowered) and sets the Group Number Selector Switch to 0 and the Station Number Selector Switch to 2. The installer then connects this second SPP station (henceforth known as Station 0.2) to the network with the Master Station already set up and connected.

Figure 20:
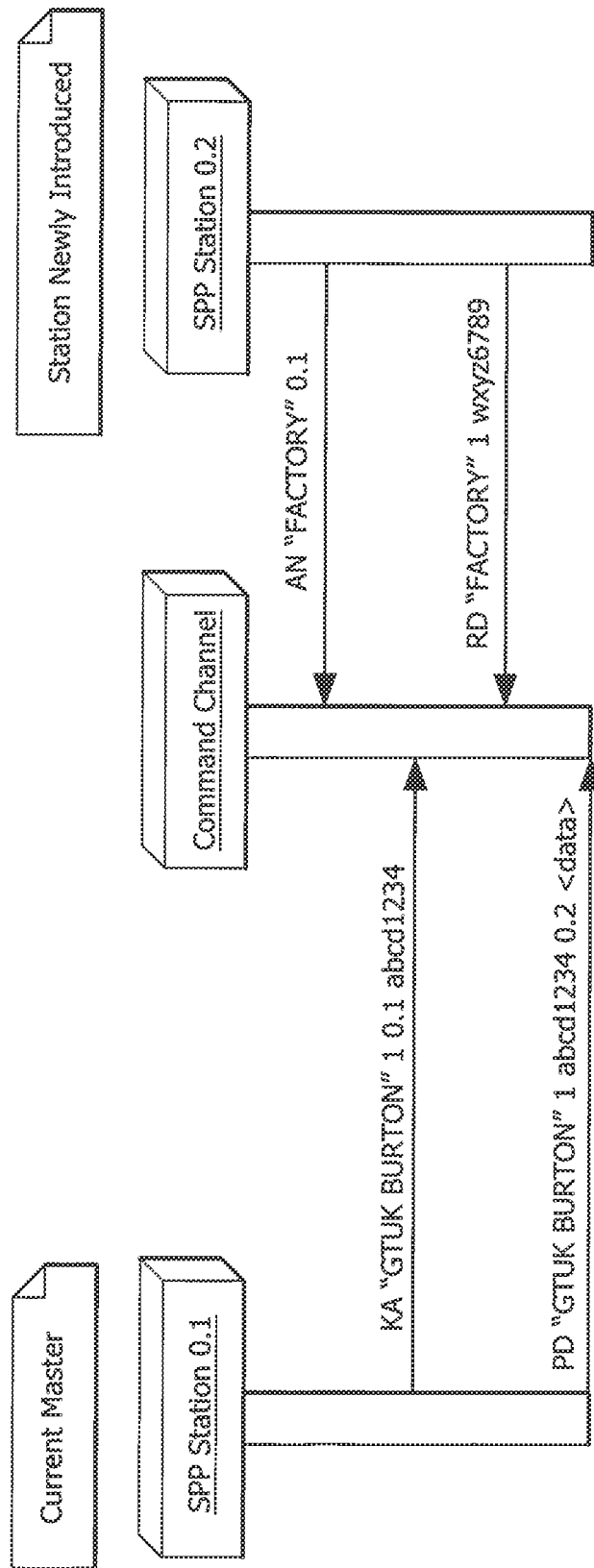

With reference to FIG. 20, the second SPP station announces itself on the Command Channel using an AN command. It then awaits a KA command from the Master Station.

When the KA command is received, Station 0.2 compares its own configuration checksum with the checksum it received from the KA command. If the checksums match, Station 0.2 shall configure itself according to the data for station name "0.2" in its own System Configuration. If the checksums are different, Station 0.2 will compare its System Version to the System Version received in the KA command. If Station 0.2 has a lower System Version number than Station 0.1, Station 0.2 requests the System Configuration data from the Master Station using an RD command. The Master Station responds to this command with a PD command to provide the configuration data.

Station 0.2 then stores the received System Configuration in non-volatile memory, recalculates the checksum on the received System Configuration and compares with the checksum it received originally from the Master and the checksum it received with the configuration itself. If all checksums match, Station 0.2 applies the received System Configuration. It then reconfigures itself according to the data for station name "0.2" in its System Configuration, and deletes the old configuration.

If the checksums do not match, the second station will raise a request the data again and repeat this process until the checksums match. If this process fails 3 times the station shall raise a "No Configuration" alarm.

Finally, if Station 0.2 is included in the Master List of its new System Configuration, has the same System Designation as the current Master Station, and is higher in the Order of Preference than the current Master Station, it shall inform the current master using an NM command (see later) and then take over the role of Master. Any relevant volatile data, such as assigned IP addresses, held by the current Master shall be transferred to the new Master in this case.

Configuration Maintenance and Updates. The KA command advertises the current configuration checksum calculated from its System Configuration to other SPP stations on the system. Any SPP station that does not have a matching configuration checksum, even if it used to match previously, shall request a configuration update by way of an RD command which the Master will respond to with a PD command. In this way, any configuration changes can be proliferated throughout the overall system while the Administrator only has to apply changes to the Master Station.

If Station 0.2 is operating in Master Allocation Mode, the Master Station shall allocate it an IP address from its corresponding Group Pool as part of this process. The SPP station then adopts the settings according to the System Configuration.

The same process should be followed to connect subsequent SPP stations to the network. In each case, the appropriate values should be set with the Station and Group Number switches for each station connected.

Loss of Master. In the event that the Master does not send the KA command within 3 times the set Keep Alive period, the remaining SPP stations included in the Master List for that System shall issue an NM command to the command channel to advertise their Group and Station Number. After all remaining SPP stations contained in the Master List have issued their command, or after a set timeout, the new Master SPP station shall be determined using the Order of Preference. The new Master shall then begin to issue KA commands to the Command Channel as normal.

Figure 21:
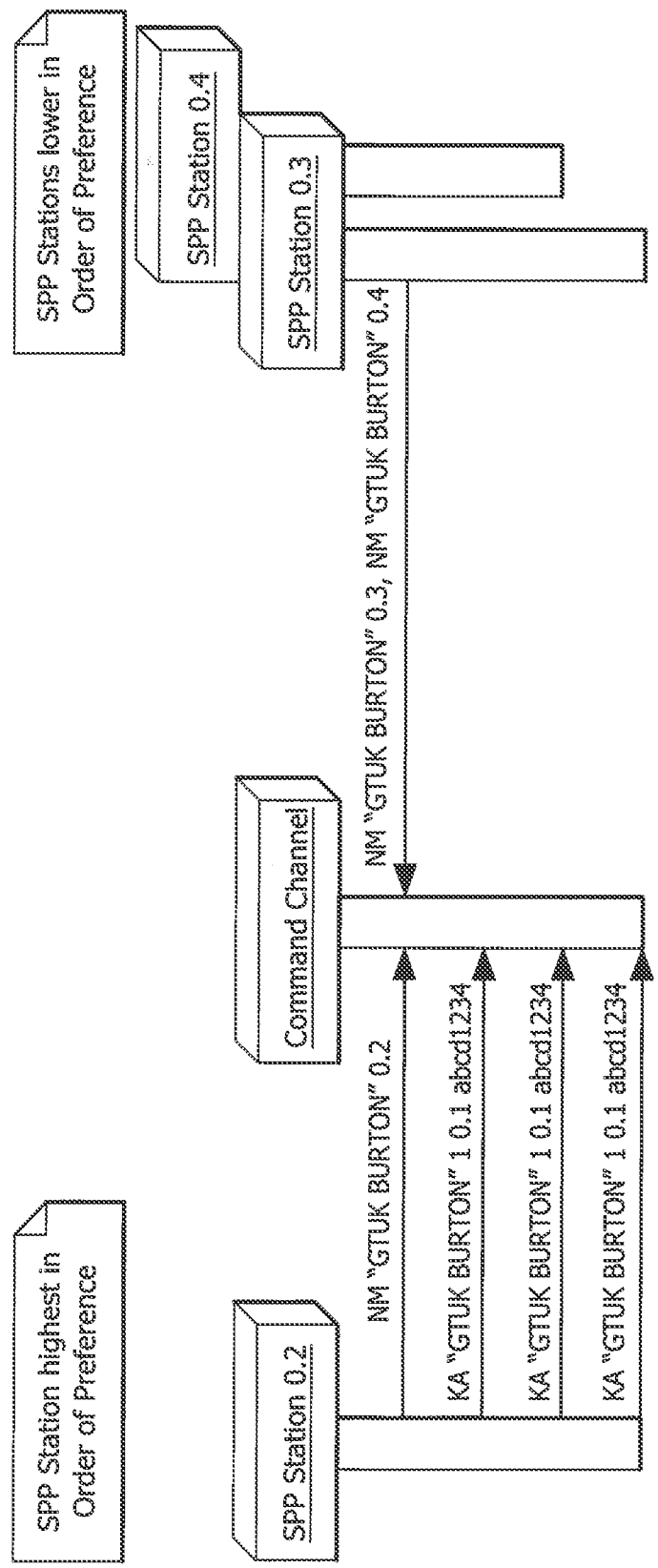

With reference to FIG. 21, if the newly negotiated Master then loses connection for whatever reason, the same behavior will repeat if the KA command is not received within the set Keep Alive period. In this way, the overall system should always have a station present in order to facilitate configuration updates and to provide an interface to the Administrator.

System Power Loss/Simultaneous Power Up. SPP stations maintain awareness of the currently configured Master in non-volatile memory. If a System Power Loss event occurs, the stations shall power up and announce themselves on the Command Channel using an AN command. They shall then wait for a KA command from the Master. If the Master has been permanently disconnected during the System Power Loss event, and the KA command is not received within 3 times the set Keep Alive period, the remaining SPP stations in the Master List shall negotiate amongst themselves to decide which SPP station should be designated the new Master Station using the same method as Loss of Master (see above).

Multiple Master Negotiation/Master Fail-over. When multiple Master Stations with the same System Designation are operating in Mutual Provisioning Mode and locate one another over the Command Channel, the SPP stations in the Master List negotiate among themselves to decide which SPP station should be designated the new Master Station using the same method as Loss of Master (see above).

If two separate systems (i.e. two groups of SPP stations with different System Designations) are merged/connected in this way, the stations on each respective system will not attempt to overwrite one another's configuration. In effect each station shall always remain part of its own System according to its System Designation until such time as it is reset to the FACTORY designation.

If using Master Allocation mode, the Master Station shall re-allocate IP addresses in order to resolve any IP or configuration conflicts it has detected (i.e. if two separate SPP station networks with separate Master-Allocated IP pools had just been connected).

Missing Configuration. If the chosen Station Group or Station Number is not configured within the current System Configuration immediately after that configuration has been applied, the SPP station shall raise a "No Configuration" alarm.

Introduction of Master from a second System. If a SPP station is connected and powered with a System Configuration from a Second system and is included in the Master List of its own System Configuration, the existing Master Station will not attempt to override it's configuration because the System Designation will differ. Similarly, other SPP stations on the first system will not make configuration requests to the Master Station from the second system, unless all Master Stations in the first system lose network connectivity.

This is a design choice to prevent SPP stations moved from other systems from corrupting the existing System Configuration. It ensures that the worst case scenario for a conflict will be that a single station will be incorrectly configured. The exception to this rule is SPP stations with the System Designation "FACTORY". These SPP stations will allow any Master to provide them with a new System Configuration until a new System Configuration alters their System Designation to another value.

Further Maintenance. When changes to an established System Configuration need to be made, the Administrator should interface with the current Master Station to make the necessary changes. This is to be done by way of a Telnet connection. The IP Address of the SPP station used for this purpose will depend upon the chosen network mode but in all cases can be configured manually as part of the System Configuration so that it is known.

When the System Configuration is updated, the KA command from the Master Station shall include the new Configuration Checksum and System Version. Other SPP stations with the same System Designation as the Master Station, a different Configuration Checksum, and a System Version lower than the Master Station shall request a configuration update from the Master Station using an RD command.

Initial Configuration. The Configuration Manager loads the System Configuration during initialization to memory. The SPP station defaults to valid, hard-coded configuration values on initialization if a System Configuration is not present. The SPP station raises a "No Configuration" alarm (e.g., using the Health Monitor) if there is no on-board configuration present.

Reset to Factory Defaults. The SPP station 20 supports Reset to Factory Defaults as an update function. The SPP station stores a Factory Default System Configuration in a non-volatile store so that it persists between power downs. When invoked, the Reset to Factory Defaults function replaces the current running System Configuration with the Factory Default System Configuration and apply the new System Configuration settings.

Configuration Update Request. The Configuration Manager supports Configuration Update Requests. The Configuration Manager accepts requests for single Configuration Field updates to the existing System Configuration or for a Reset to Factory Defaults.

User Accounts & Access Levels. The System Configuration maintains a list of 5 User accounts which are used to authorize access to and modification of the configuration on the SPP station, as well as authorizing commands issued to the SPP station. Each user account shall consist of:

Username. Unique Identifier. Values: 32-character string.
Password. Values: 32-character ASCII string.
Access Level. Values: 1-5.

Access Levels. The System Configuration maintains a list of 5 Access Levels which are referenced by the User Accounts. An Access Level defines a permissive list of which configurable parameters/commands can be changed or invoked by a User with that Access Level. Any parameter/command not included on that Access Level cannot be accessed by that access level. Additionally, each Access Level consists of:

Access Level. Unique Identifier. Values: 1-5.

Each SPP station 20 also has a special User Account with Access Level 0. This account is a reserved account intended for use by manufacturing. This access level does not have any access restrictions placed upon it. The account preferably always exists on the system, and should be automatically generated by the SPP station in the event that it is absent from the configuration.

Audio Manager

With continued reference to FIG. 11, the SPP station 20 supports an Audio Manager process 106. The Audio Manager is responsible for routing audio to and from the hardware peripherals. The Audio Manager 106 implements, for example, Audio Manager State Diagrams (and associated sub-states) described herein with reference to FIGS. 12 through 15

Figure 12:
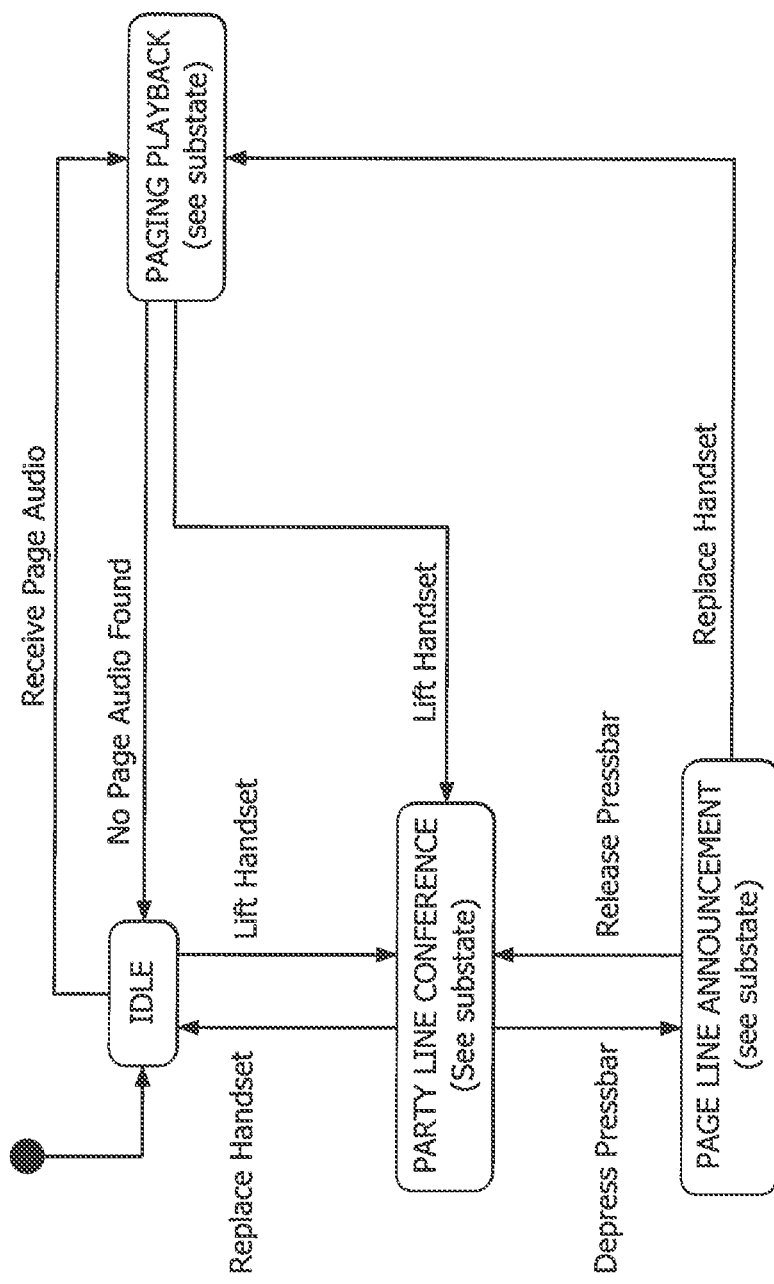
FIGS. 12, 13, 14, 15, 16, 17 and 18 are state diagrams implemented by the various software modules in FIG. 11.

With reference to FIG. 12, the Audio Manager manages the audio routing to/from peripherals and channel priority negotiation for the Page Line.

Figure 13:
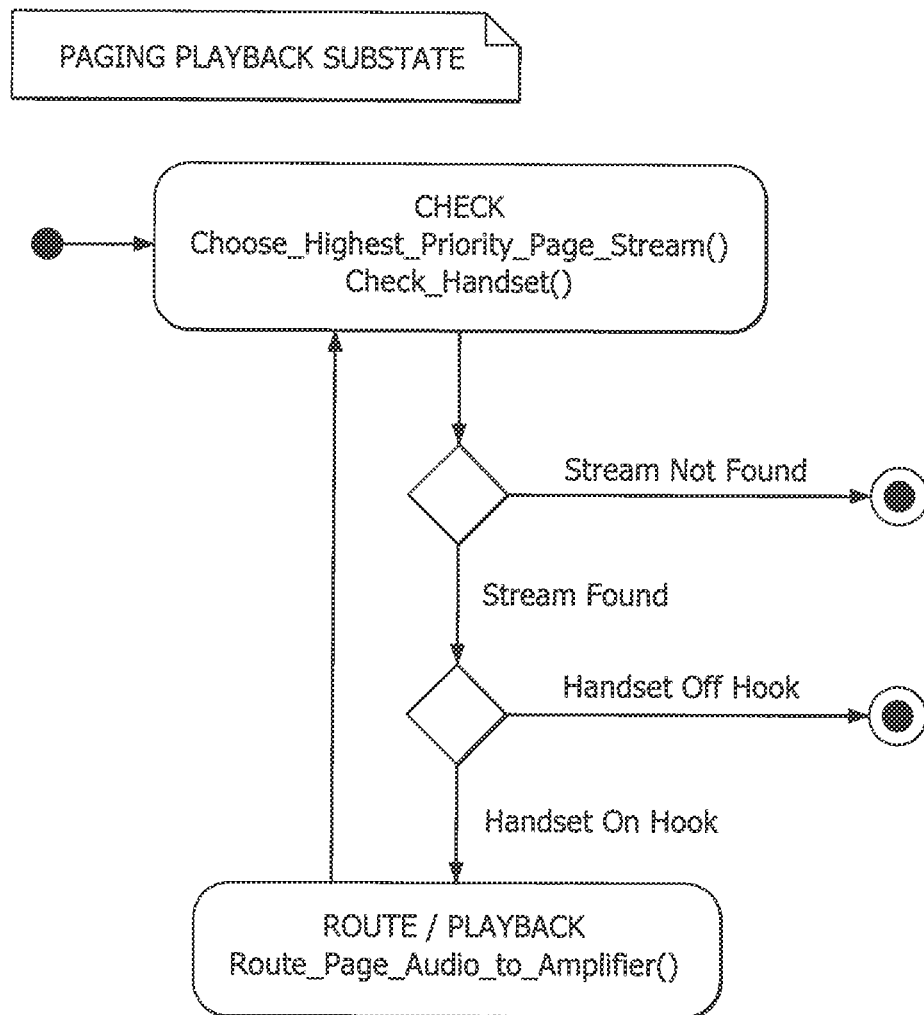

FIG. 13 illustrates a state diagram for a Paging Playback substate in FIG. 12. For example, initially the Pressbar is released, and the Handset is on Hook. The SPP station receives Page Line audio on a higher priority than the one currently being played back at the amplifier. The SPP station stops routing lower priority inbound Page Line audio to the Amplifier. The SPP station mixes the highest priority inbound Page Line audio streams and routes the mixed audio to the Amplifier.

Figure 14:
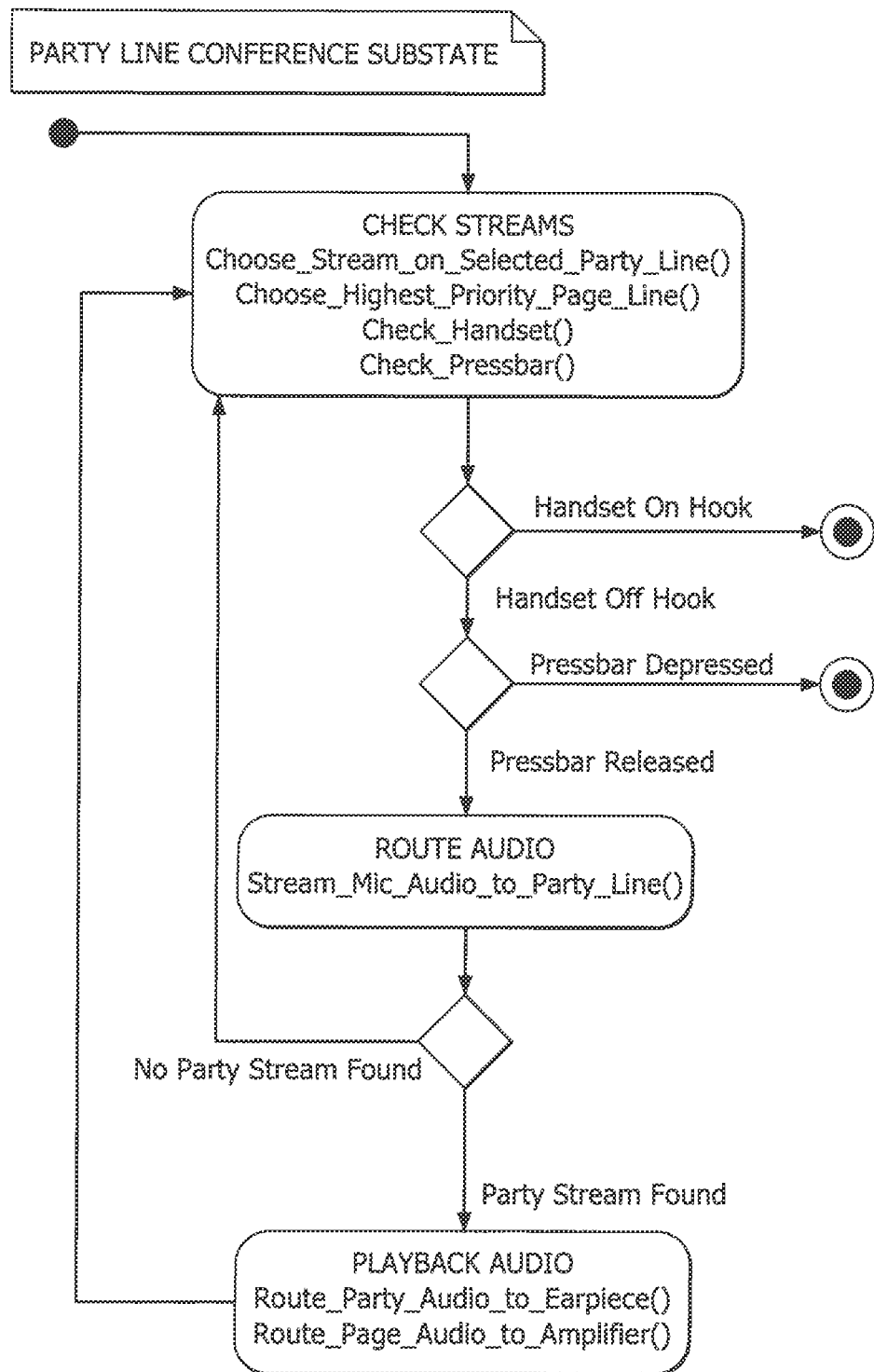

FIG. 14 illustrates a state diagram for a Party Line Conference substate in FIG. 12. For example, initially the Pressbar is released, and the Handset is on Hook. The User lifts the Handset. The SPP station begins to sample the audio at the Microphone. The SPP station routes sampled audio to the selected Party Line. The SPP station routes audio received on the selected Party Line to the Earpiece.

Figure 15:
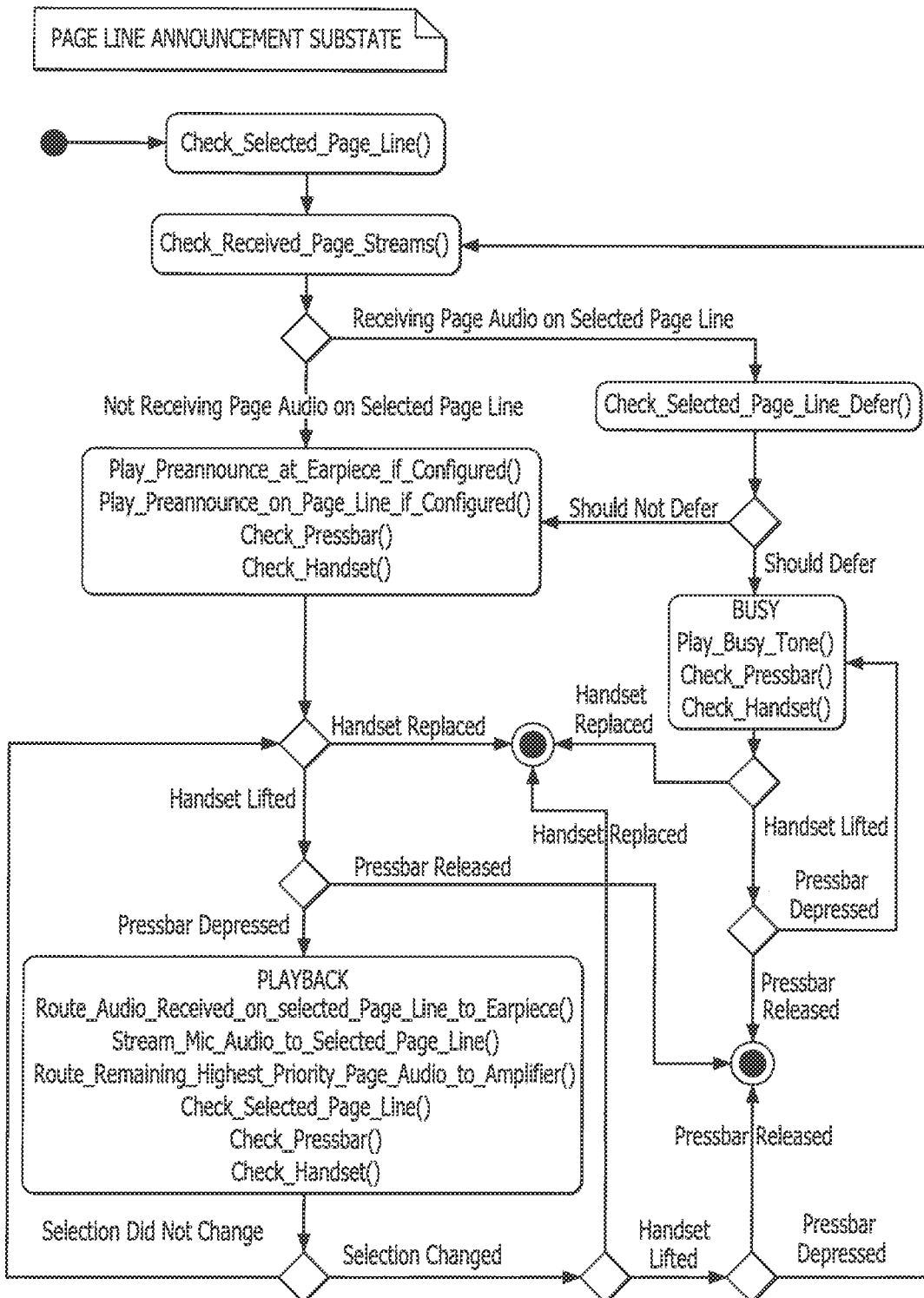

FIG. 15 illustrates a state diagram for a Page Line Announcement substate. For example, initially the Pressbar is released, and the Handset is on Hook. The User depresses the Pressbar. The SPP station 20 stops routing audio received on the selected Page Line to the Amplifier. The SPP station routes audio received on the selected Page Line to the Earpiece. The SPP station mixes remaining highest priority inbound Page Line audio streams and routes the mixed audio to the Amplifier. As an exception, the SPP station can be configured to defer on the currently selected Page Line while audio is being received on that Page Line. SPP station plays busy tone at the earpiece until the handset 22 goes on hook or the Pressbar is released. The SPP station 20 otherwise routes pre-announce tone to earpiece for a fixed time. The SPP station routes pre-announce tone to selected Page Line for a fixed time. The SPP station begins to sample the audio at the Microphone. The SPP station routes sampled audio to the selected Page Line. As another exception, the User can alter the selected Page Line. SPP station is configured to defer on the newly selected Page Line while audio is being received on that Page Line. SPP station plays busy tone at the earpiece instead of audio/pre-announce until the handset goes on hook or the Pressbar is released.

Transmission and Reception of Audio between stations. With continued reference to the Audio Manager generally in FIG. 11, the SPP station transmits and receives audio over an IP Network. The following describes illustrative means by which audio is sampled and transmitted and received between SPP stations.

Audio Sampling. Audio can be sampled at the Microphone and/or the Auxiliary Audio Input as monaural PCM. The rate of audio sampling can be fixed at a rate of at least 8000 Hz. A higher standard sampling rate may be used to achieve greater audio sampling quality subject to hardware and performance constraints. A sampling rate of below 8000 Hz is generally unacceptable. The PCM data from each device can be stored in a separate circular buffer (i.e. one buffer per device). The PCM from the Auxiliary Audio Input shall only be used when the Auxiliary Audio Contact is Active.

Audio Down-sampling. When PCM audio is read from the circular buffer, it may need to be down-sampled to a lower frequency before it is compressed. This mechanism is required in order to match the chosen compression scheme for transmission and also for future development in the form of additional compression schemes. A given PCM audio stream may or may not need to be down-sampled; this is dependent upon the chosen fixed sampling rate and also the requirement of the compression scheme being used. The PCM is preferably not altered to a resolution lower than 8000 Hz prior to compression.

Audio Compression. Sampled audio can be read from the circular buffer as whole 'frames'. Any partial frames (for example, at the end of a conversation) can be padded with silence. The frame size depends upon the compression scheme used. Each frame of audio can be encoded using one of the following standard compression schemes such as:

G.711 u-law,
G.711 a-law,
G.729.

It is understood that other compression schemes can be used. For example, wider-bandwidth codecs can be used along with a compatible compression scheme. The compression scheme to use for compression is configurable by input source Microphone/Auxiliary Input.)

Figure 22:
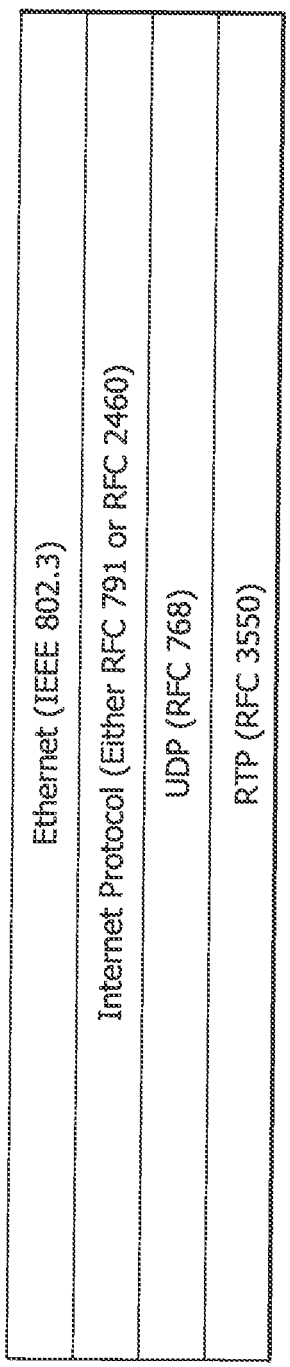
FIG. 22 illustrates an illustrative packet of data transmitted and received by the SPP stations in accordance with an illustrative embodiment of the present invention.

Audio Transmission. Compressed frames are transmitted from an SPP station across the Network using RTP over IP at a rate of either 10 or 100 MBit/s auto-negotiated. Multicast addressing is used so that each packet may be received by multiple SPP stations. Each packet of data is structured as shown in FIG. 22, for example. Each layer of the packet structure conforms to the relevant RFC. Note that for a single packet, the IP layer can only conform to RFC 791 (IPv4) or RFC 2460 (IPv6). The IP layer cannot conform to both at the same time. SRTP (Secure RIP) could be used if data encryption were a desired feature.

Audio Destination. The network destination of audio from the Microphone is determined by the software state of the SPP station, controlled by the Page Switch, Party Switch and Pressbar. Auxiliary Audio is transmitted to the socket selected by the Page Socket.

RTP Layer. This layer is the core mechanism behind the transmission and reception of audio with a SPP station. For the most part, the RTP layer of transmitted packets is structured according to RFC 3550. An example structure is provided below to illustrate that:

some fields in the RTP layer are optional; the scope of an example implementation is captured here;
the CSRC field is intended for use in a non-standard way; and
the size of the Payload field may vary between implementations.

The RTP layer of each packet can be constructed as follows:

| Offset | 0-1 | 2 | 3 | 4-7 | 8 | 9-15 | 16-31 |
|---|---|---|---|---|---|---|---|
| 0-31 | V | P | X | CC | M | Payload Type | Sequence Number |
| 32-63 | | | | | | Time-stamp | |
| 64-95 | | | | | | SSRC | |
| 96-127 | | | | | | CSRC | |
| 128-X | | | | | | Payload | |

V: Protocol version. Values: 2.
P: Padding. Not used. Values: 0
X: Extension. Not used. Values: 0.
CC: CSRC Count. Indicates the presence of the CSRC header. Values: 0, 1.
M: Marker bit. Not used, Values: 0.
Payload Type: Indicates payload encoding format. Values: 0 (G.711 u-law) or 8 (G.711 a-law).
Sequence Number: Sequence Number. Incrementing number indicating position of payload in packet sequence. Values: 0-65535
Time-stamp: Offset (ms) used to synchronize RTP during clock drift. Values: 0-4294967295.
SSRC: Unique RTP stream ID. Randomly generated. Values: 0-4294967295.
CSRC: Unique RTP stream ID. Configurable for Mutual Mute. Values: 0-4294967295.
Payload: Encoded audio. Size may vary according to the compression algorithm in use.

Each device has a configurable CSRC field which can contain a single value. Any other station with this value configured in their Mutual Mute List shall ignore audio from this SPP station.

Audio Reception (Network). Audio is received from the network 40 by extracting the encoded payload data within RTP packet streams on sockets that the SPP station is configured to listen for. The SPP station 20 is able to listen on up to 1 Party Socket and up to 8 Page Sockets simultaneously. The payload data from the selected Party Socket (according to the Party-Line Selector Switch position) is buffered and ready for decompression. Simultaneously, the payload data is buffered from the highest priority Page Socket as determined by the software state (e.g., the state diagrams in FIGS. 12-16) and the configured priority assignments. Each Page Socket has a numeric priority value associated with it that may hold a value between 1-8. Each Page Socket must be configured with a unique priority value and this shall be enforced by validation. SPP stations may need to receive Page Announcements from areas outside of their immediate communication group (i.e. the Page/Party channels that they may transmit upon), such as emergency multicast announcements from other SPP stations or audio streams from external multicast systems. Therefore, up to 8 Page Sockets can be supported instead of just 4 Page Sockets.

Filtering. The payload data is not buffered, but rather immediately discarded, if the value of the CSRC field matches a value contained in the Mutual Mute list on the SPP station, or, one of the header fields in either the UDP or RTP layer does not conform to one of the specified values (indicates incompatible stream configuration).

Audio Decompression. The payload in each RTP packet is decoded according to the compression scheme indicated by the Payload Type field within the RTP layer. This produces a monaural PCM frame of at least 8000 Hz. A higher playback rate may be achieved (up to the sampling rate of the received data) subject to hardware evaluation and performance constraints.

Identification. The SSRC field within the RTP layer is used to associate each PCM frame with an active 'channel' for mixing purposes. Where a matching channel cannot be found, a new channel is created to store the new audio data. There is a maximum of 8 channels.

Buffering. Received PCM frames are stored in a circular buffer associated with the allocated channel. The buffer has a user configurable size of between 20 ms 2000 ms in real time.

Mixing. When there is at least one frame available on each active receiving channel, the oldest frame from each channel is mixed into a single PCM frame of 80 samples. This frame is stored in a circular buffer associated with the receiving socket ready for playback.

Playback. Audio is routed to the appropriate peripheral once that socket receives priority (in the case of Page Audio) or becomes the selected Line (in the case of Party Audio). The details of where and when audio is routed to the earpiece/amplifier is described above in connection with FIGS. 12-15.

General I/O (Input/Output) Manager.

Figure 16:
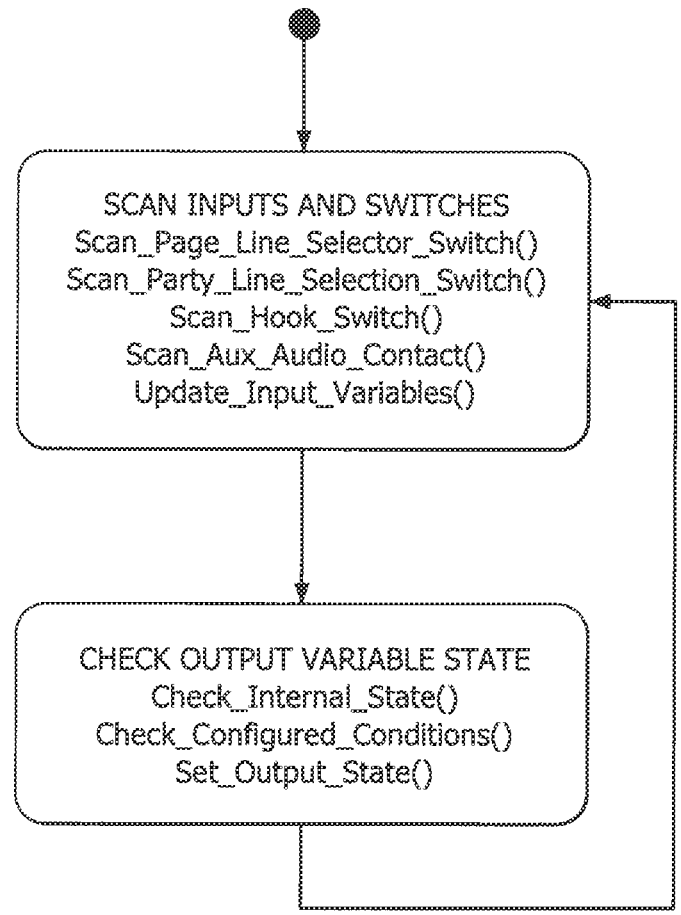

The SPP station supports a General I/O Manager 108 that reads the Page Line Selector Switch, the Party Line Selector Switch, the Hook Switch and the Auxiliary Audio Contact and maintains the input and output states. More generally, the General I/O Manager 108 is a process which is responsible for reading the electronic state of the various hardware peripherals as inputs and setting the state of the various peripherals as outputs. The General I/O Manager can implement, for example, the General I/O Manager State Diagram as shown in FIG. 16.

Outputs. The General I/O Manager 108 supports requests to set the state of 6 configurable Outputs. The SPP station drives each of these 6 peripherals based on its internal logical state and the configured activation conditions for that peripheral.

Each logical state may be combined for a different peripheral. Where more than one state is used, a logical OR between the two states shall be performed to determine the final output state of the peripheral.

The exception to this are the ON and OFF states. These states override all other states. ON and OFF cannot be configured to the same peripheral at the same time.

The activation conditions of each output on SPP station 20 for this purpose are as follows:

IDLE. When the SPP station 20 is in the Idle State (Handset On Hook, Pressbar Depressed, no Page announcements in progress).

RXPAGEANY. When the SPP station is receiving Page audio on one or more of the Page channels.

RXPAGEn. When the SPP station is receiving Page audio on the Page channel specified by 'n' (1-8).

TXPAGEANY. When the SPP station is transmitting Page audio on one of the Page channels.

TXPAGEn. When the SPP station is transmitting Page audio on the Page channel specified by 'n' (1-8).

PARTY. When the SPP station is in a Party-line conference.

PARTYn. When the SPP station is in a Party-line conference on the line specified by 'n' (1-5).

OFFHOOK. When the SPP station Hook-Switch is in the Off-Hook state.

ONHOOK. When the SPP station Hook-Switch is in the On-Hook state.

FAULTY. When there are one or more Events logged which indicate a fault state.

HEALTHY. When there are no Events logged which indicate a fault state.

ON. Set the output to the Active state.

OFF. Set the output to the Inactive state.

Inputs. The General I/O Manager 108 supports requests to read the functional state of the system inputs. The support inputs are:

Party Switch
Page Switch
Hook Switch
Pressbar

Whenever the General I/O Manager receives a request for the functional state of one of the above inputs, the General I/O Manager 108 shall read that device and return the correct value.

Amplifier State. The Amplifier has two states which are controlled using a relay. The relay is driven from a GPI© pin. The General EM Manager supports two Amplifier states:

SPKR
AMP

Whenever the General I/O Manager 108 receives a request to set the state of the Amplifier relay to one of the above, it drives the corresponding pin accordingly. Typically, the Amplifier State is driven by the Health Monitor.

Telnet Client

With continued reference to FIG. 11, the SPP station supports a Telnet service as a human usable interface. The Telnet service allows a Telnet client 112 to form a TCP connection to the SPP station and interface with the Internal Command System. The Telnet Client challenges each new connection to present a valid login. A login is valid if the Requester enters the strings matching those stored in the SPP station configuration fields for User Login and User Password.

SNMP (Simple Network Management Protocol) Client.

With continued reference to FIG. 11, the SPP station hosts an SNMP Agent for reporting health status changes to and for handling health status requests from an SNMP Management System. This Agent maintains a Management Information Base in order to expose the relevant health status information.

The SNMP Client 114 supports SNMP Traps to report health status changes as asynchronous events to the SNMP Management System. The SPP Client does not support configuration provisioning via SNMP. The SPP Client retrieves the system status using the Internal Command System. The SNMP Client challenges each new connection to present a valid login. A login shall be valid if the Requester enters the strings matching those stored in the SPP station configuration fields for User Login and User Password. The SNMP Client maintains the Management Information Base (MIB) for the SPP station.

TFTP (Trivial File Transfer Protocol) Client

With continued reference to FIG. 11, the SPP station supports a TFTP Client 116 for transmitting/receiving firmware and configuration between a TFTP server and the SPP station. The TFTP Client reads and writes data to the SPP station via the Internal Command System.

Configuration Updates. The TFTP Client 116 allows an Administrator to transmit configuration and/or MPG data as a plain text file to the SPP station 20. Configuration files can consist of part or all fields. The TFTP Client will only attempt to update Configuration fields that are specified within the configuration file used. The TFTP Client performs validation on the file before applying configuration updates. If any fields fail validation, the TFTP Client rejects the entire update.

Configuration Retrieval. The TFTP Client 116 allows an Administrator to retrieve MPG data from the SPP station. The TFTP Client also allows an Administrator to retrieve the configuration settings from the SPP station as a plain text file.

Firmware Updates. The TFTP Client 116 provide a mechanism for the SPP station to retrieve a firmware update from a TFTP server in order to self-update. Upon a successful firmware download, the SPP station performs a reboot in order to apply the new firmware version.

Authentication. The TFTP Client 116 challenges each new connection to present a valid login. A login shall be valid if the Requester enters the strings matching those stored in the SPP station configuration fields for User Login and User Password.

File Macros. The TFTP Client supports update file macros. The supported macros are:

| Name | Syntax | Description |
| --- | --- | --- |
| MACID | % macid | When performing a TFTP update, if the MACID macro is used, the TFTP Client will replace this macro with the SPP station configured MAC Address. |
| IP | % ip | When performing a TFTP update, if the IP macro is used, the TFTP Client will replace this macro with the SPP station configured IP Address. |
| NAME | % name | When performing a TFTP update, if the NAME macro is used, the TFTP Client will replace this macro with the SPP station configured Hostname. |

TFTP Boot Configuration Update. The SPP station supports an option to perform TFTP configuration updates on boot. When this option is enabled, the TFTP Client attempts to perform a configuration update after the SPP station has initialized.

TFTP Timed Configuration Update. The SPP station supports TFTP timed updates. When this option is enabled, the TFTP Client attempts to perform a configuration update at a set time. The SPP station also supports a TFTP update interval. When configured, the TFTP Client attempts to update the configuration at an interval after the time set for the Timed Configuration Update. The interval is configurable in hours and minutes.

Health Monitor

With continued reference to FIG. 11, the SPP station 20 supports a Health Monitor 110 as a software service. The Health Monitor 110 is responsible for monitoring a set of internal conditions on the SPP station. The Health Monitor is also be responsible for logging Events. The Health Monitor also monitors the internal system process to ensure that they are still working. This is done by a simple request-response mechanism to each process.

Heartbeat LED. The Health Monitor 110 drives a heartbeat LED. The LED shall cadence at a steady rate of 500 ms on, 500 ms off. This function serves as an indication that the software has not stalled. If any of designated internal services have failed, then the heartbeat function shall cadence at a steady rate of 250 ms on, 250 ms off. If the Heartbeat LED ceases to function, this indicates that the Health Monitor has stalled.

Events. The SPP station supports Event logging. An Event is defined as something that has occurred that the SPP station has detected and recorded. Each Event is recorded along with a time and date stamp. For example, an Event can be logged whenever one of the following occurs:

| Event | Description |
| --- | --- |
| Station Online | The Station has initialized successfully. |
| Station Page Playback | The Station is in the Paging Playback State. |
| Station Page Announcement | The Station is in the Page Announcement State. |
| Station Idle | The Station is in the Idle State. |
| Station Party Conference | The Station is in the Party Line Conference State. |
| Unexpected Reboot | The Station booted unexpectedly. |
| Handset Off-Hook | The Handset was removed from its stowage. |
| Handset On-Hook | The Handset was put back on its stowage. |

Figure 18:
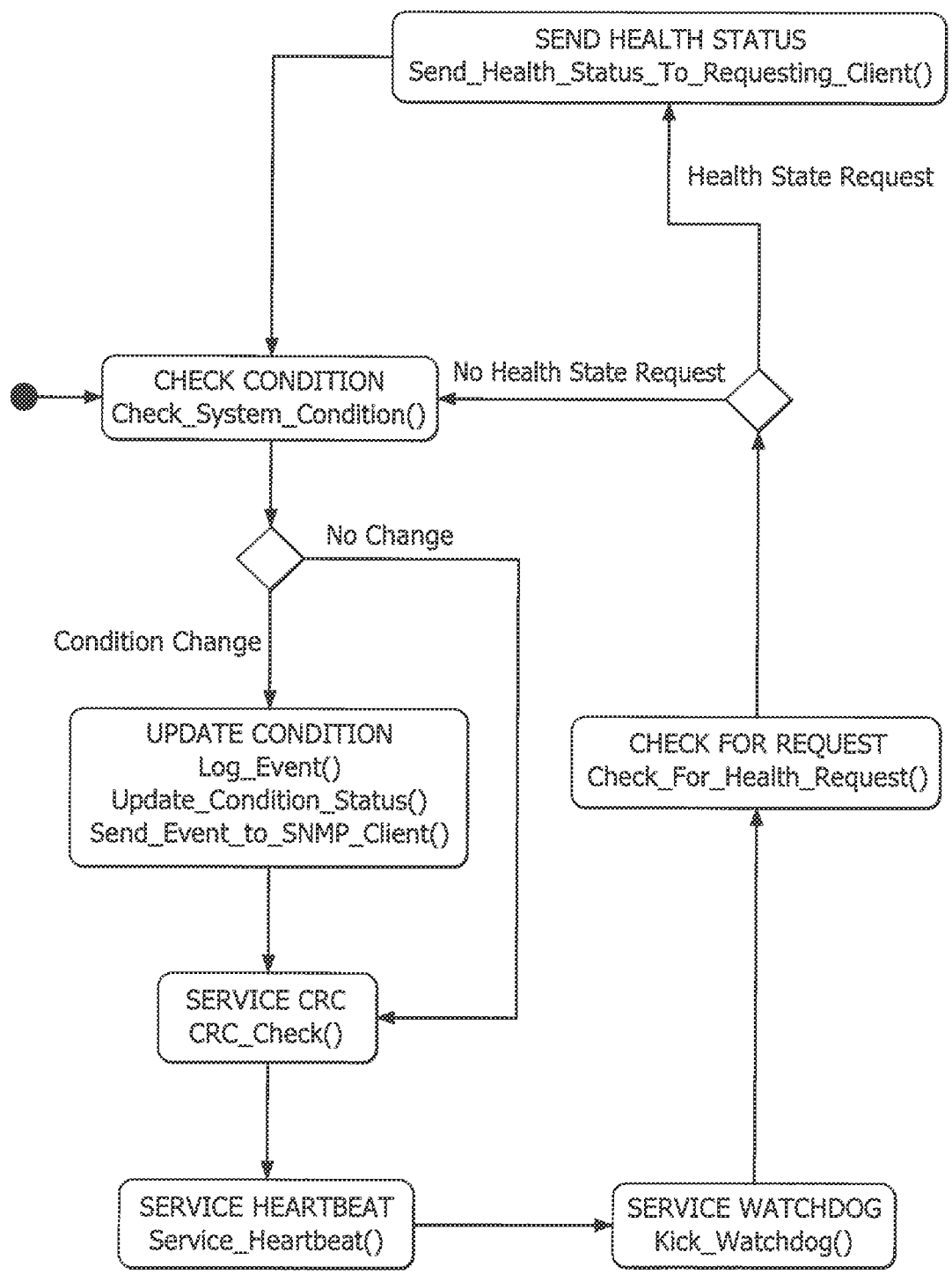

FIG. 18 provides an illustrative state diagram for the Health Monitor 110 as it continuously monitors the current health state of the overall system, maintains the current system health state, handles requests for health status information, and triggers health status reports.

GLOSSARY

CRC. Cyclic Redundancy Check.

DHCP. Dynamic Host Configuration Protocol: a client/server protocol that automatically provides an Internet Protocol (IP) host with its IP address and other related configuration information.

EMAC. Ethernet MAC.

Event. An incident which the SPP Station has detected and recorded in an internal log.

Handset. Physical container for Earpiece, Microphone, Hook Switch.

IP. Internet Protocol.

IP-PBX. Internet Protocol Private Branch Exchange.

IT. Information Technology

LAN. Local Area Network.

LED. Light Emitting Diode

Lift Handset. To take the handset off its stowage (e.g., cradle).

MAC. Media Access Control; MAC data communication protocol is a sub-layer of the OSI data link layer (layer 2).

Master. The currently active Master Station for Mutual Provisioning

Off Hook. The handset has been removed from its stowage (e.g., cradle).

On Hook. The handset has been placed on its stowage.

Page Line. One of 4 broadcast channels.

Page Announcement. A one-way audio broadcast to one or more SPP Stations using a Page channel.

Page Line Audio. Audio received on a Page channel (network or auxiliary).

Party Line. One of 5 conference channels.

Party Line Conference. A conversation between two or more SPP Station users using a Party channel.

PCB. Printed Circuit Board.

PCM. Pulse Code Modulation.

Replace Handset. To place the handset on its stowage (e.g., cradle).

RFC 3550. Internet standards track protocol. See https://www.ietf.org/rfc/rfc3550.txt or http://www.rfc-base.org/txt/rfc-3550.txt.

RTP. Real-Time Transport Protocol.

SIP. Session Initiation Protocol.

SNMP. Simple Network Management Protocol.

Socket. An IP address and port combination used to send/receive RTP.

SPP. Serverless Page Party.

SRAM. Static Random Access Memory.

Station Clock. Internal timekeeping process.

TCP. Transmission Control Protocol.

TFTP. Trivial File Transfer Protocol: a simple, lock-step, file transfer protocol which allows a client to get from or put a file onto a remote host.

UART. Universal Asynchronous Receiver/Transmitter.

UDP. User Datagram Protocol.

VoIP. Voice over Internet Protocol (IP)

Zone. A pre-configured Page Line Socket.

Additional Embodiments and Implementations

Illustrative embodiments of the present invention have been described with reference to operations at a programmable device such as a Page/Party station or VoIP phone or server for station configuration or health monitoring in an intercom system. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, DVDs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

APPENDIX

The following illustrative configurable fields shall be internally configurable on the SPP station within a System Configuration. Some fields are only configurable by certain users. Some fields are limited to either Profiles or Groups (e.g., where P=Profile, G=Group).

The configuration file format can be, for example, a plain text file comprising Profiles and Groups. Each Profile and Group defined within the file can contain a subset of configuration fields.

Illustrative General Settings Fields:

| Field Name | Values | P | G |
|---|---|---|---|
| System Designation | 32 character ASCII string. | | |
| System Version | 0-255. | | |
| Serial Number | 32 character ASCII string. | | |
| MAC Address | 00:17:AE:xx:xx:xx, where the "x" can be 0 - F hex. Must be unique among all network devices in the world. | | |
| TFTP Server | ipv4: 0.0.0.0 - 255.255.255.255 ipv6: 0:0:0:0:0:0:0:0 - ffff:ffff: ffff:ffff: ffff:ffff: ffff:ffff | | X |
| TFTP File | 64 character ASCII string. | X | X |
| IP Address | ipv4: 0.0.0.0 - 255.255.255.255 ipv6: 0:0:0:0:0:0:0:0 - ffff:ffff:ffff:ffff:ffff:ffff:ffff:ffff | | |
| Subnet Mask | ipv4: 0.0.0.0 - 255.255.255.255 ipv6: 0:0:0:0:0:0:0:0 - ffff:ffff: ffff:ffff: ffff:ffff: ffff:ffff | | X |
| Gateway | ipv4: 0.0.0.0 - 255.255.255.255 ipv6: 0:0:0:0:0:0:0:0 - ffff:ffff:ffff:ffff:ffff:ffff:ffff:ffff | | X |
| Hostname | 32 character ASCII string consisting of "a-z", "0-9" and "—" | | |
| Network Mode | Static, DHCP, Master Allocation | | X |
| DHCP Loss Function | Enabled, Disabled | | X |
| IP Mode | IPv4, IPv6 | | X |
| DNS Server | ipv4: 0.0.0.0 - 255.255.255.255 ipv6: 0:0:0:0:0:0:0:0- ffff:ffff:ffff:ffff: ffff:ffff:ffff:ffff | | X |
| Debug Verbosity | 0-3. | X | X |

Party Settings - Fields

| Field Name | Values | P | G |
|---|---|---|---|
| Party Address 1 | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Party Port 1 | 0-65535 | X | X |
| Party Address 2 | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Party Port 2 | 0-65535 | X | X |
| Party Address 3 | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Party Port 3 | 0-65535 | X | X |
| Party Address 4 | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Party Port 4 | 0-65535 | X | X |
| Party Address 5 | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Party Port 5 | 0-65535 | X | X |

Page Settings - Fields

| Field Name | Values | P | G |
|---|---|---|---|
| Page 1 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 1 Port | 0-65535 | X | X |
| Page 1 Defer | ON/OFF | X | X |
| Page 1 Zone | NONE, A, B, C, D | X | X |
| Page 2 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 2 Port | 0-65535 | X | X |
| Page 2 Defer | ON/OFF | X | X |
| Page 2 Zone | NONE, A, B, C, D | X | X |
| Page 3 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 3 Port | 0-65535 | X | X |
| Page 3 Defer | ON/OFF | X | X |
| Page 3 Zone | NONE, A, B, C, D | X | X |
| Page 4 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 4 Port | 0-65535 | X | X |
| Page 4 Defer | ON/OFF | X | X |
| Page 4 Zone | NONE, A, B, C, D | X | X |
| Page 5 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 5 Port | 0-65535 | X | X |
| Page 5 Defer | ON/OFF | X | X |
| Page 5 Zone | NONE, A, B, C, D | X | X |
| Page 6 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 6 Port | 0-65535 | X | X |
| Page 6 Defer | ON/OFF | X | X |
| Page 6 Zone | NONE, A, B, C, D | X | X |
| Page 7 Address | ipv4: 0.0.0.0 OR 224.0.0.0 - 239.255.255.255 ipv6: 0.0.0.0.0.0.0 OR ff00:0:0:0:0:0:0:0 - ffff:ffff:ffff:ffff:ffff:ffff:ffff:ffff | X | X |
| Page 7 Port | 0-65535 | X | X |
| Page 7 Defer | ON/OFF | X | X |
| Page 7 Zone | NONE, A, B,C, D | X | X |
| Page 8 Address | ipv4: 0.0.0.0 OR 224.0.0.0 - 239.255.255.255 ipv6: 0:0:0:0:0:0:0:0 OR ff00:0:0:0:0:0:0:0 - ffff:ffff:ffff:ffff:ffff:ffff:ffff:ffff | X | X |
| Page 8 Port | 0-65535 | X | X |
| Page 8 Defer | ON/OFF | X | X |
| Page 8 Zone | NONE, A, B, C, D | X | X |

Other fields can be set for Audio settings, SNMP Agent settings, Output settings, Hookswitch and Pressbar State Control settings, among others.

The invention claimed is:
1. A method performed by a processor for managing Internet Protocol (IP)-based stations connected via a network comprising:

configuring the IP-based stations to route packets between each other via multicast without a central device controlling inter-station communications between the IP-based stations by:

assigning multicast sockets to respective lines employed by the IP-based stations and chosen from one or more party lines and one or more page lines;

storing system configuration data at each of the IP-based stations; assigning a dedicated multicast address to common channel used by the IP-based stations to communicate with each other; and updating the IP-based stations' configuration data based on communications via the common channel to allow the IP-based stations to automatically transmit on and listen to sockets based on their corresponding configuration data;

wherein the configuration data comprises a system designation identifying a system, and respective station identifiers for each of the IP-based stations deployed in that system; and wherein the system configuration further comprises a group identifier for each of one or more groups of IP-based stations deployed in the system and designated ones of the station identifiers that are assigned to each group, each group having a corresponding group configuration comprising configurable fields that are used to configure each of the IP-based stations assigned to that group, and the system configuration comprises a profile for an IP-based station that comprises the system designation, a group number for the group to which the IP-based station is assigned, and the station identifier of the IP-based station.

2. The method of claim 1, wherein the system configuration comprises different group configurations for respective group identifiers, each of the group configurations comprising allocations of multicast addresses that designate respective page sockets and respective party line sockets used by selected ones of the IP-based stations assigned to a corresponding one of the group identifiers.

3. The method of claim 1, wherein the system configuration comprises a fixed IP address for the IP-based station.

4. The method of claim 1, wherein the master station allocates an IP address to the IP-based station.

5. The method of claim 1, wherein the inter-station communications between the IP-based stations comprises page announcing and party line conferencing between the IP-based stations.

\* \* \* \* \*